United States Patent
Li et al.

(10) Patent No.: US 12,479,846 B2
(45) Date of Patent: Nov. 25, 2025

(54) EZH2 INHIBITOR AND USE THEREOF

(71) Applicant: PHARMABLOCK SCIENCES (NANJING), INC., Jiangbei New Area Nanjing (CN)

(72) Inventors: Jin Li, Jiangbei New Area Nanjing (CN); Hongdao Chen, Jiangbei New Area Nanjing (CN); Liu Liu, Jiangbei New Area Nanjing (CN); Minmin Yang, Jiangbei New Area Nanjing (CN)

(73) Assignee: PHARMABLOCK SCIENCES (NANJING), INC., Jiangsu (CN)

( * ) Notice: Subject to any disclaimer, the term of this patent is extended or adjusted under 35 U.S.C. 154(b) by 1057 days.

(21) Appl. No.: 17/608,950

(22) PCT Filed: May 7, 2020

(86) PCT No.: PCT/CN2020/088861
§ 371 (c)(1),
(2) Date: Nov. 4, 2021

(87) PCT Pub. No.: WO2020/224607
PCT Pub. Date: Nov. 12, 2020

(65) Prior Publication Data
US 2022/0281872 A1 Sep. 8, 2022

(30) Foreign Application Priority Data
May 7, 2019 (CN) .......................... 201910376057.4

(51) Int. Cl.
*C07D 487/04* (2006.01)
*A61P 35/00* (2006.01)

(52) U.S. Cl.
CPC ............ *C07D 487/04* (2013.01); *A61P 35/00* (2018.01)

(58) Field of Classification Search
CPC ........ A61P 35/00; A61P 35/02; A61K 31/435; A61K 31/5517; C07D 487/04; C07D 487/06; C07D 401/06; C07D 401/14
See application file for complete search history.

(56) References Cited

U.S. PATENT DOCUMENTS

| | | | |
|---|---|---|---|
| 2012/0270857 A1* | 10/2012 | Guzzo | A61P 1/14 540/496 |
| 2014/0135316 A1 | 5/2014 | Albrecht et al. | |
| 2016/0297805 A1 | 10/2016 | Seitz et al. | |
| 2018/0072702 A1 | 3/2018 | Kuntz et al. | |

FOREIGN PATENT DOCUMENTS

| | | | |
|---|---|---|---|
| CN | 102762576 A | 10/2012 | |
| CN | 105452246 A | 3/2016 | |
| CN | 107922434 A | 4/2018 | |
| WO | WO-0116136 A2 * | 3/2001 | ............. A61P 17/00 |
| WO | 2012068589 A2 | 5/2012 | |
| WO | 2012118812 A2 | 9/2012 | |
| WO | 2014195919 A1 | 12/2014 | |
| WO | 2015077194 A1 | 5/2015 | |
| WO | 2015193768 A1 | 12/2015 | |
| WO | 2017035060 A1 | 3/2017 | |
| WO | 2019222272 A1 | 11/2019 | |

OTHER PUBLICATIONS

Gan et al. Biomarker Research (2018) 6:10. (Year: 2018).*
Chinese Office Action for Application No. 201910376057.4, 6 pages (2022). [Translation.].
Taylor, A., et al., "Discovery of Benzotriazolo[4,3-d][1,4]diazepines as Orally Active Inhibitors of BET Bromodomains", ACS Med Chem Lett 7, 145-150 (2016).
Ansari, A., et al., "Novel 3-methylindoline inhibitors of EZH2: design synthesis and SAR", Bioorganic & Medicinal Chemistry Letters, doi: http://dx.doi.org/10.1016/j.bmcl.2016.11.080, 9 pages (2016).
Patent Cooperation Treaty, International Search Report for PCT/CN2020/088861, Translation, 4 pages dated Jul. 27, 2020.
Qin, Y, et al., "EZH2 inhibitors and antitumor therapy", Chemistry of Life 3(37), 402-404 (2017). [English Abstract].

* cited by examiner

Primary Examiner — Kara R. Mcmillian
(74) Attorney, Agent, or Firm — Viksnins Harris Padys Malen LLP

(57) ABSTRACT

The present application provides a compound represented by formula (I), or a pharmaceutically acceptable salt, ester, prodrug, complex, solvate, hydrate, or isomer thereof; and a use thereof in preparing drugs used to treat EZH2-mediated disease.

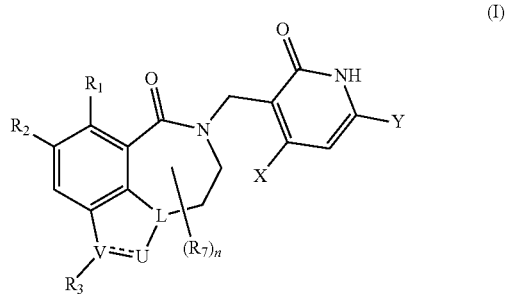

8 Claims, No Drawings

EZH2 INHIBITOR AND USE THEREOF

CROSS-REFERENCE TO RELATED APPLICATION(S)

This patent application claims the benefit of priority of Chinese Patent Application No. 201910376057.4, filed on May 7, 2019.

TECHNICAL FIELD

The present application belongs to the field of chemical pharmaceuticals, and specifically, relates to an EZH2 inhibitor and use thereof.

BACKGROUND

Epigenetic alterations play an important role in cell evolution (including cell proliferation, cell differentiation, and cell survival). Epigenetic silencing of tumor suppressor genes and activation of oncogenes may be induced through the alteration of CpG island methylation patterns, histone modification, and abnormal regulation of DNA binding protein. *Drosophila* Pc genes are a group of epigenetic effectors. Enhancer of zeste homolog 2 (EZH2) is the catalytic component of *Drosophila* Pc gene polycomb repressive complex 2 (PRC2), which is a conserved multi-subunit complex that inhibits gene transcription by methylating lysine at position 27 of the histone H3 (H3K27). EZH2 plays a key role in regulating gene expression patterns (such regulation determines the fate of cells, such as differentiation and self-renewal). The overexpression of EZH2 in some cancer cells is associated with cell proliferation, cell invasion, chemical resistance, and metastasis.

The up-regulation of EZH2 expression has been observed in many solid tumors (including prostate cancer, breast cancer, skin cancer, bladder cancer, liver cancer, pancreatic cancer, and head and neck cancer), and is associated with cancer invasion and metastasis. Recurrent somatic mutations in EZH2 have been identified in diffuse large B cell lymphoma (DLBCL) and follicular lymphoma (FL).

At present, all the EZH2 inhibitors under development are still in the clinical stage, such as EPZ6438 (Tazemetostat, clinical stage II), CPI-1205 (clinical stage I/II), PF-6821497 (clinical stage I), SHR-2554 (clinical stage I/II), etc., and there are no EZH2 inhibitors on the market at present. Therefore, EZH2 lead compounds with a novel compound structure and good activity are still in urgent need of research and development.

SUMMARY

The present application discloses a class of compounds that can be used as EZH2 inhibitors and their use in the preparation of a medicament for the treatment of EZH2-mediated disease.

In one aspect, the present application provides a compound represented by Formula (I) or a pharmaceutically acceptable salt, ester, prodrug, complex, solvate, hydrate or isomer thereof:

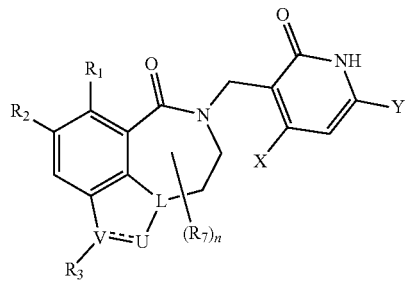

wherein $R_1$ is selected from hydrogen, halogen, $C_1$-$C_6$ alkyl, hydroxyl, cyano or amino;

$R_2$ is selected from —$CR_4R_5$, —$NR_4R_5$, 4-15-membered heterocyclyl, $C_6$-$C_{10}$ aryl or 5-14-membered heteroaryl, wherein the heterocyclyl, aryl or heteroaryl is optionally substituted by one or more $R_6$, and $R_6$ is selected from halogen, hydroxyl, cyano, amino or $C_1$-$C_6$ alkyl optionally substituted by hydroxyl or cyano;

$R_3$ is selected from hydrogen, halogen, $C_1$-$C_6$ alkyl, hydroxyl, cyano or amino;

$R_4$ and $R_5$ are each independently selected from $C_1$-$C_6$ alkyl, $C_1$-$C_6$ alkoxy or 4-15-membered heterocyclyl;

U, V, and L are each independently selected from C or N, and at least one of U, V or L is N;

X and Y are each independently selected from $C_1$-$C_6$ alkyl, $C_1$-$C_6$ fluoroalkyl, $C_1$-$C_6$ alkoxy or $C_1$-$C_6$ fluoroalkoxy;

$R_7$ is selected from hydrogen, halogen, $C_1$-$C_6$ alkyl, hydroxyl, cyano or amino;

n=0, 1 or 2; and

⎓⎓⎓⎓ represents a single bond or a double bond.

In some embodiments, Formula (I) is Formula (Ia):

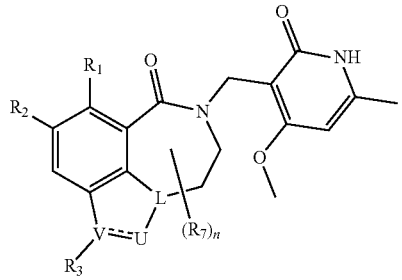

wherein $R_1$ is selected from hydrogen, halogen, $C_1$-$C_6$ alkyl, hydroxyl, cyano or amino;

$R_2$ is selected from —$CR_4R_5$, —$NR_4R_5$, 4-15-membered heterocyclyl, $C_6$-$C_{10}$ aryl or 5-14-membered heteroaryl, wherein the heterocyclyl, aryl or heteroaryl is optionally substituted by one or more $R_6$, and $R_6$ is selected from halogen, hydroxyl, cyano, amino or $C_1$-$C_6$ alkyl optionally substituted by hydroxyl or cyano;

$R_3$ is selected from hydrogen, halogen, $C_1$-$C_6$ alkyl, hydroxyl, cyano or amino;

$R_4$ and $R_5$ are each independently selected from $C_1$-$C_6$ alkyl, $C_1$-$C_6$ alkoxy or 3-12-membered heterocyclyl;

U, V, and L are each independently selected from C or N, and at least one of U, V or L is N;

R₇ is selected from hydrogen, halogen, $C_1$-$C_6$ alkyl, hydroxyl, cyano or amino;

n=0, 1 or 2; and

~~~~~~ represents a single bond or a double bond.

The heterocyclyl is a monocyclic or polycyclic (including two or more fused rings, including a spiral, fused or bridged system such as a double-ring system), saturated or unsaturated non-aromatic 4 to 15-membered ring system that contains 1 to 14 ring carbon atoms and 1 to 10 ring heteroatoms, wherein the ring heteroatoms are each independently selected from O, S, N, P, and B. The heterocyclic alkyl group may also optionally contain one or more oxo (i.e., =O) or thiocarbonyl (i.e. =S) groups. For example, a 4 to 12-membered heterocyclic alkyl is a monocyclic or polycyclic, saturated or unsaturated non-aromatic 4 to 12-membered ring system that contains one or more ring heteroatoms.

The aryl is an all-carbon monocyclic or fused polycyclic aromatic group with a conjugated pi electron system. The aryl may have 6 to 10 carbon atoms in one or more rings. Most commonly, the aryl group has 6 carbon atoms in a ring. For example, $C_6$-$C_{10}$ aryl is an aromatic group containing 6 to 10 carbon atoms, such as a phenyl or naphthyl.

The heteroaryl is a monocyclic or fused polycyclic aromatic heterocyclic group having one or more heteroatom ring members (ring atoms) in at least one ring, wherein the heteroatom ring members are each independently selected from O, S, and N. The heteroaryl group has 5 to 14 ring atoms, including 1 to 13 carbon atoms and 1 to 8 heteroatoms selected from O, S, and N. In some embodiments, the heteroaryl group has 5 to 10 ring atoms, including 1 to 4 heteroatoms. The heteroaryl group may also contain 1 to 3 oxo or thiocarbonyl (i.e., =S) groups. In some embodiments, the heteroaryl group has 5 to 8 ring atoms, including 1, 2 or 3 heteroatoms. For example, a 5-membered heteroaryl group is a monocyclic heteroaryl group as defined above, which has 5 ring atoms in the monocyclic heteroaryl ring; a 6-membered heteroaryl group is a monocyclic heteroaryl group as defined above, which has 6 ring atoms in the monocyclic heteroaryl ring; a 5-10 heteroaryl group is a monocyclic or bicyclic heteroaryl group as defined above, which has 5, 6, 7, 8, 9 or 10 ring atoms in the monocyclic or bicyclic heteroaryl ring.

In other embodiments, $R_1$ is selected from halogen or $C_1$-$C_6$ alkyl;

$R_2$ is selected from —$CR_4R_5$, —$NR_4R_5$ or 5-6-membered heteroaryl, wherein the heteroaryl is optionally substituted by one or more $R_6$, and $R_6$ is $C_1$-$C_6$ alkyl optionally substituted by hydroxyl or cyano;

$R_3$ is selected from hydrogen or halogen;

$R_4$ and $R_5$ are each independently selected from $C_1$-$C_6$ alkyl, $C_1$-$C_6$ alkoxy or 4-6-membered heterocyclyl;

U, V, and L are each independently selected from C or N, and at least one of U, V or L is N;

$R_7$ is selected from hydrogen or $C_1$-$C_6$ alkyl;

n=0 or 1; and

~~~~~~ represents a single bond or a double bond.

In other embodiments, $R_1$ is selected from chlorine or methyl;

$R_2$ is selected from the following substituents:

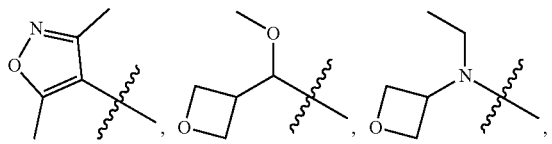

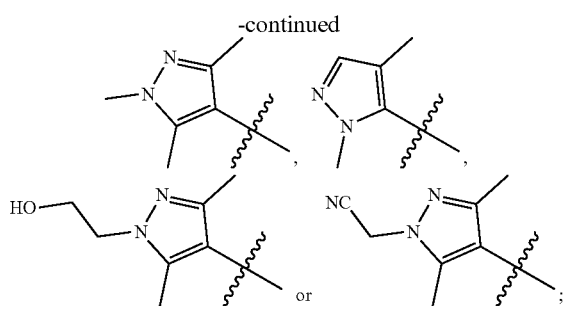

$R_3$ is selected from hydrogen or chlorine;

U, V, and L are each independently selected from C or N, and at least one of U, V or L is N;

$R_7$ is selected from hydrogen or methyl;

n=0 or 1; and

~~~~~~ represents a single bond or a double bond.

In other embodiments, the compound is any one of the following compounds:

10-chloro-9-(3,5-dimethylisoxazol-4-yl)-2-((4-methoxy-6-methyl-2-oxo-1,2-dihydropyridin-3-yl)methyl)-3,4-dihydro-[1,4]diazepino[6,7,1-HI]indol-1(2H)-one (1)

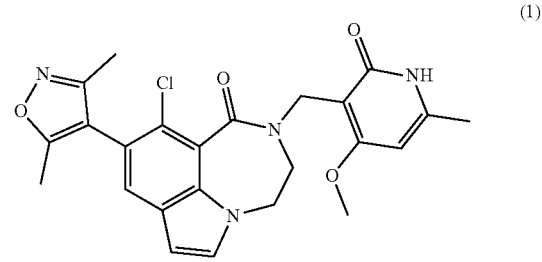 [SMILES: COc1cc(C)[nH]c(=O)c1CN1CCn2ccc3cc(-c4c(C)noc4C)c(Cl)c(c32)C1=O]

(1)

10-chloro-9-(ethyl(oxetan-3-yl)amino)-2-((4-methoxy-6-methyl-2-oxo-1,2-dihydropyridin-3-yl)methyl)-3,4-dihydro-[1,4]diazepino[6,7,1-HI]indol-1(2H)-one (2)

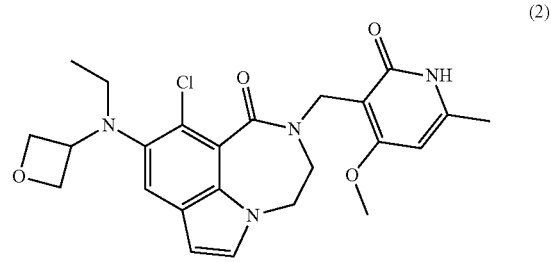 [SMILES: CCN(c1cc2ccn3c2c(c1Cl)C(=O)N(Cc1c(OC)cc(C)[nH]c1=O)CC3)C1COC1]

(2)

10-chloro-9-(3,5-dimethylisoxazol-4-yl)-2-((4-methoxy-6-methyl-2-oxo-1,2-dihydropyridin-3-yl)methyl)-3,4,6,7-tetrahydro-[1,4]diazepino[6,7,1-HI]indol-1(2H)-one (3)

(3)

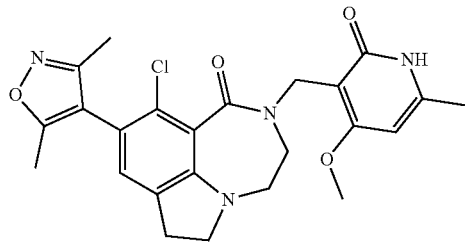

10-chloro-2-((4-methoxy-6-methyl-2-oxo-1,2-dihydropyridin-3-yl)methyl)-9-(1,3,5-trimethyl-1H-pyrazol-4-yl)-3,4-dihydro-[1,4]diazepino[6,7,1-HI]indol-1(2H)-one (4)

(4)

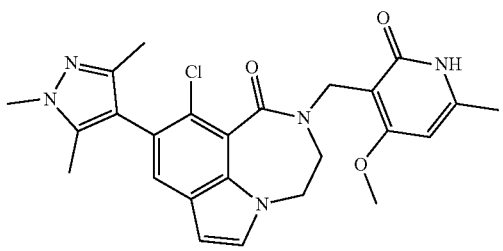

10-chloro-9-(1,4-dimethyl-1H-pyrazol-5-yl)-2-((4-methoxy-6-methyl-2-oxo-1,2-dihydropyridin-3-yl)methyl)-3,4-dihydro-[1,4]diazepino[6,7,1-HI]indol-1(2H)-one (5)

(5)

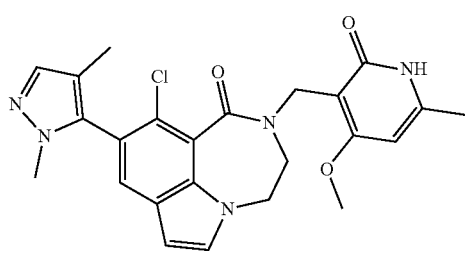 [SMILES: COc1cc(C)[nH]c(=O)c1CN1CCn2ccc3cc(-c4c(C)cnn4C)c(Cl)c(c32)C1=O]

7,10-dichloro-9-(1,4-dimethyl-1H-pyrazol-5-yl)-2-((4-methoxy-6-methyl-2-oxo-1,2-dihydropyridin-3-yl)methyl)-3,4-dihydro-[1,4]diazepino[6,7,1-HI]indol-1(2H)-one (6)

(6)

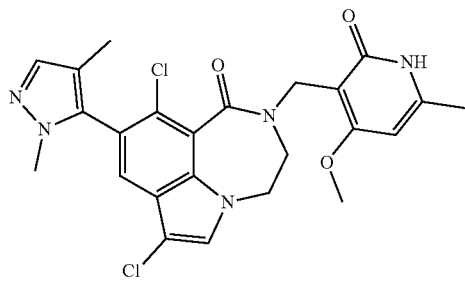

10-chloro-9-(1-(2-hydroxyethyl)-3,5-dimethyl-1H-pyrazol-4-yl)-2-((4-methoxy-6-methyl-2-oxo-1,2-dihydropyridin-3-yl)methyl)-3,4-dihydro-[1,4]diazepino[6,7,1-HI]indol-1(2H)-one (7)

(7)

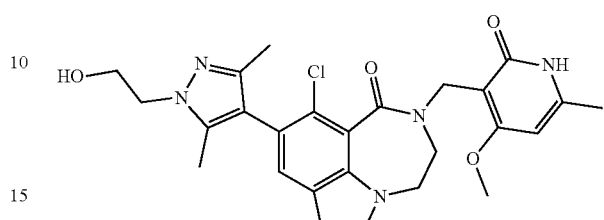

2-(4-(10-chloro-2-((4-methoxy-6-methyl-2-oxo-1,2-dihydropyridin-3-yl)methyl)-1-oxo-1,2,3,4-tetrahydro-[1,4]diazepino[6,7,1-HI]indol-9-yl)-3,5-dimethyl-1H-pyrazol-1-yl)acetonitrile (8)

(8)

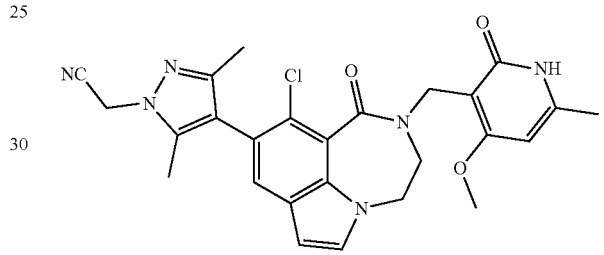

10-chloro-9-(methoxy(oxetan-3-yl)methyl)-2-((4-methoxy-6-methyl-2-oxo-1,2-dihydropyridin-3-yl)methyl)-3,4-dihydro-[1,4]diazepino[6,7,1-HI]indol-1(2H)-one (9)

(9)

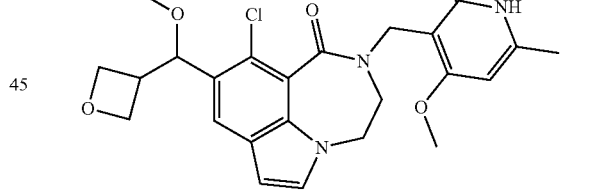

(R)-10-chloro-9-(methoxy(oxetan-3-yl)methyl)-2-((4-methoxy-6-methyl-2-oxo-1,2-dihydropyridin-3-yl)methyl)-3,4-dihydro-[1,4]diazepino[6,7,1-HI]indol-1(2H)-one (10)

(10)

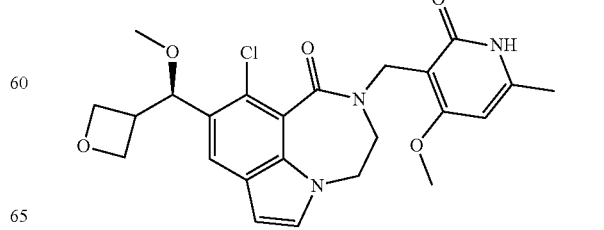

(S)-10-chloro-9-(methoxy(oxetan-3-yl)methyl)-2-((4-methoxy-6-methyl-2-oxo-1,2-dihydropyridin-3-yl)methyl)-3,4-dihydro-[1,4]diazepino[6,7,1-HI]indol-1(2H)-one (11)

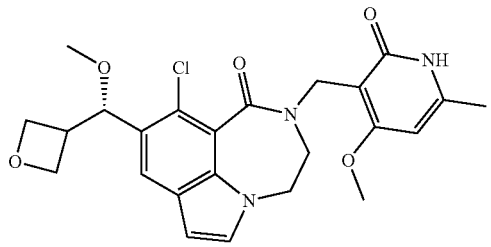

(11)

5-chloro-4-(3,5-dimethylisoxazol-4-yl)-7-((4-methoxy-6-methyl-2-oxo-1,2-dihydropyridin-3-yl)methyl)-8,9-dihydro-[1,4]diazepino[6,7,1-HI]indazol-6(7H)-one (12)

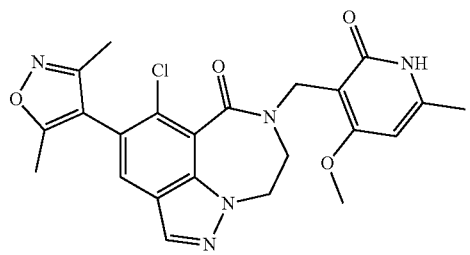

(12)

5-chloro-4-(3,5-dimethylisoxazol-4-yl)-7-((4-methoxy-6-methyl-2-oxo-1,2-dihydropyridin-3-yl) methyl)-8,9-dihydro-2,7,9a-triazabenzo[cd]azulen-6(7H)-one (13)

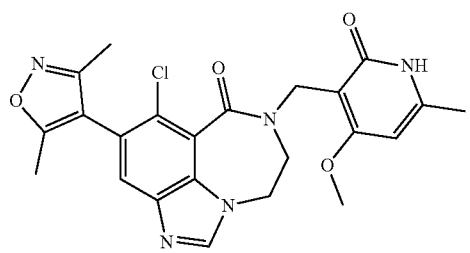

(13)

9-(methoxy(oxetan-3-yl)methyl)-2-((4-methoxy-6-methyl-2-oxo-1,2-dihydropyridin-3-yl)methyl)-10-methyl-3,4-dihydro-[1,4]diazepino[6,7,1-HI]indol-1(2H)-one (14)

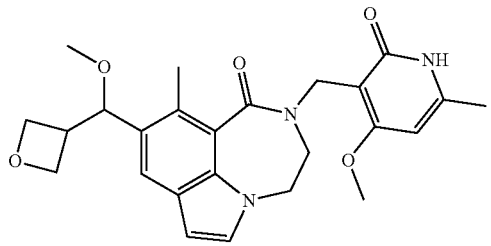

(14)

9-(3,5-dimethylisoxazol-4-yl)-2-((4-methoxy-6-methyl-2-oxo-1,2-dihydropyridin-3-yl)methyl)-1 O-methyl-3,4-dihydro-[1,4]diazepino[6,7,1-HI]indol-1(2H)-one (15)

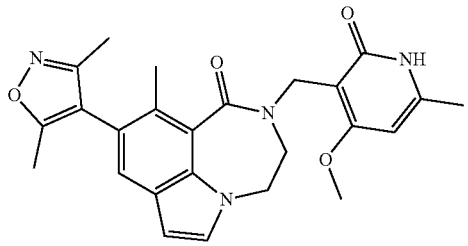

(15)

10-chloro-9-(3,5-dimethylisoxazol-4-yl)-2-((4-methoxy-6-methyl-2-oxo-1,2-dihydropyridin-3-yl)methyl)-4-methyl-3,4-dihydro-[1,4]diazepino[6,7,1-HI]indol-1(2H)-one (16)

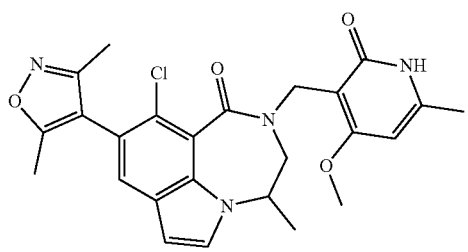

(16)

and
10-chloro-9-(3,5-dimethylisoxazol-4-yl)-2-((4-methoxy-6-methyl-2-oxo-1,2-dihydropyridin-3-yl)methyl)-3-methyl-3,4-dihydro-[1,4]diazepino[6,7,1-HI]indol-1(2H)-one (17)

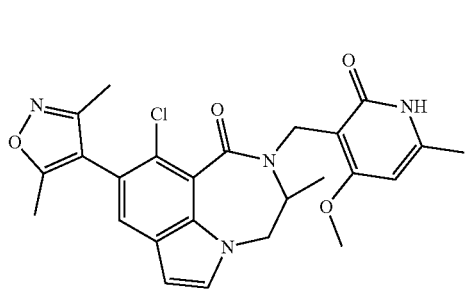

(17)

In another aspect, the present application provides a pharmaceutical composition. The pharmaceutical composition includes a therapeutically effective amount of the preceding compound or a pharmaceutically acceptable salt, ester, prodrug, complex, solvate, hydrate or isomer thereof, and a pharmaceutically acceptable carrier or excipient.

In another aspect, the present application provides use of the preceding compound or a pharmaceutically acceptable salt, ester, prodrug, complex, solvate, hydrate or isomer thereof in the preparation of a medicament for the treatment of EZH2-mediated disease.

The EZH2-mediated cancer may be cancer, and the cancer is lung cancer, gastric cancer, liver cancer, breast cancer, nasopharyngeal cancer, pancreatic cancer, ovarian cancer, cervical cancer, colorectal cancer, glioma, melanoma, prostate cancer, kidney cancer, esophageal cancer, mesothelioma, head and neck cancer, bladder cancer, salivary gland cancer, leukemia or lymphoma, particularly, anaplastic large cell lymphoma or non-Hodgkin's lymphoma.

In another aspect, the present application provides a compound represented by Formula (II) or Formula (III):

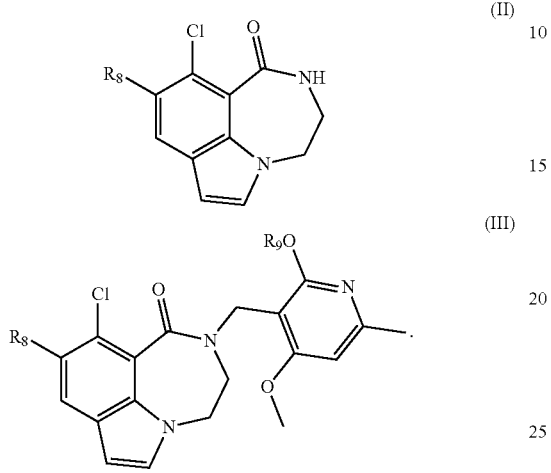

wherein $R_8$ is halogen, and $R_9$ is a hydroxy-protecting group. The hydroxy-protecting group may be a silicon protecting group, such as trimethylsilyl, tert-butyldimethylsilyl, tert-butyldiphenylsilyl, and triisopropylsilyl; may be a benzyl protecting group, such as benzyl and p-methoxybenzyl; or may be an alkoxy methyl protecting group or propenyl protecting group.

In some embodiments, $R_8$ is bromine, and $R_9$ is benzyl.

The compound represented by Formula (II) or Formula (III) may be used to prepare the compound represented by Formula (I).

DETAILED DESCRIPTION

Example 1 10-chloro-9-(3,5-dimethylisoxazol-4-yl)-2-((4-methoxy-6-methyl-2-oxo-1,2-dihydropyridin-3-yl)methyl)-3,4-dihydro-[1,4]diazepino[6,7,1-HI]indol-1(2H)-one (1)

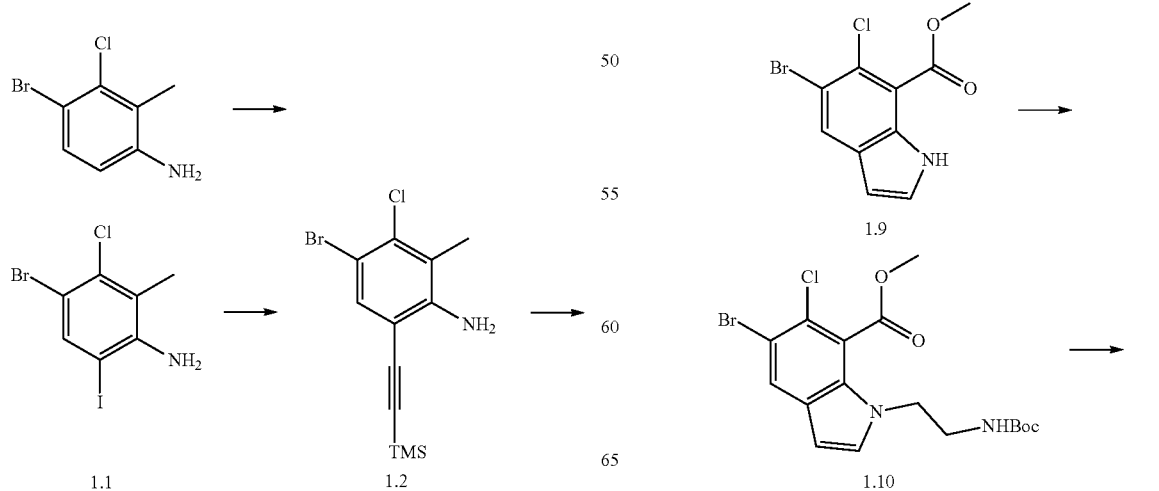

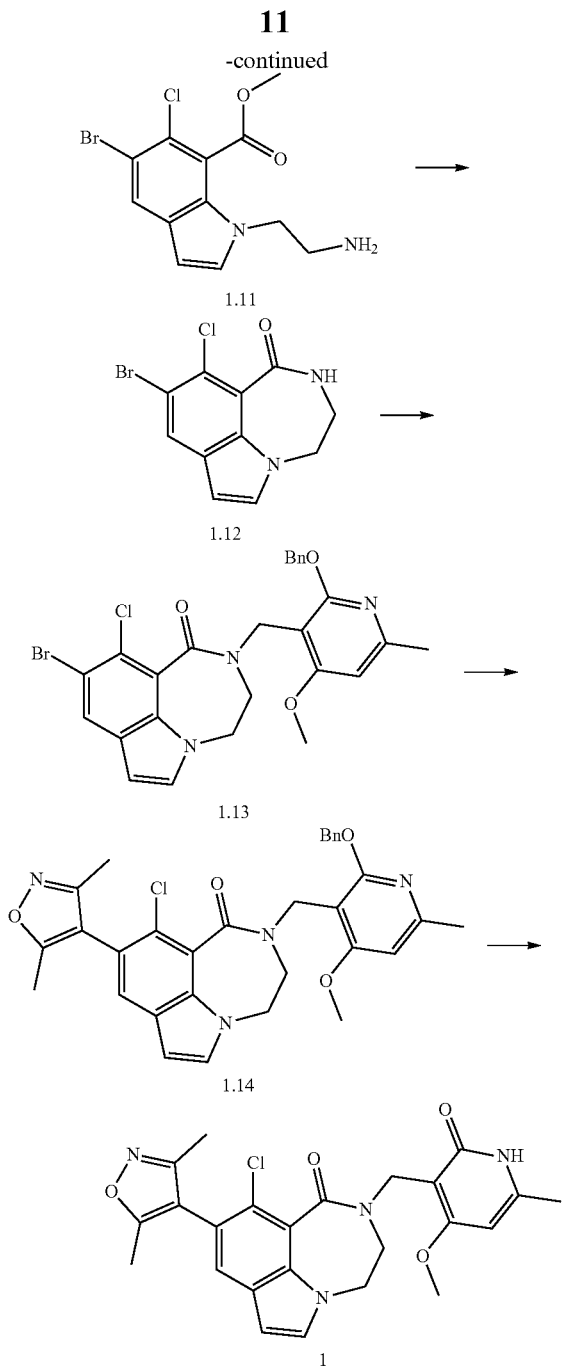

4-bromo-3-chloro-2-methylaniline (70.00 g, 318 mmol, 1.0 eq.) was dissolved in AcOH (500 mL) with stirring, AcONa (36.70 g, 445 mmol, 1.4 eq.) was added, then NIS (78.75 g, 349 mmol, 1.1 eq.) was added portion-wise at ice-water bath temperature, and the reaction mixture was stirred at ambient temperature for 16 hours. The reaction mixture was concentrated to dryness and diluted with EtOAc/water. The organic phase was washed with an aqueous solution of NaOH, dried with MgSO$_4$, and concentrated to dryness. The resulting residue was washed with PE/EtOAc=10/1 to give Intermediate 1.1 (60.50 g, 55% yield) as a gray-white solid. $^1$H NMR (400 MHz, DMSO-d$_6$) δ (ppm) 7.79 (s. 1H), 5.34 (s, 2H), 2.31 (s. 3H).

Intermediate 1.1 (60.00 g, 173 mmol, 1.0 eq.), CuI (4.94 g, 26.1 mmol, 0.15 eq.), and Pd(PPh$_3$)$_2$Cl$_2$ (18.21 g, 26.1 mmol, 0.15 eq.) were dissolved in TEA (500 mL) under stirring, trimethylsilylacetylene (38.70 g. 208 mmol. 1.2 eq.) was added under a nitrogen atmosphere, and the reaction mixture was stirred at ambient temperature for 4 hours. The reactants were filtered with celite pad and washed with EtOAc. The organic phases were combined and concentrated to dryness. The residue was purified by column chromatography (silica gel, PE/EtOAc=100/1) to give Intermediate 1.2 (55.00 g, 100% yield) as a yellow oil.

Intermediate 1.2 (47.00 g, 149 mmol, 1.0 eq.) was dissolved in DMF (500 mL) with stirring, t-BuOK (35.90 g, 297 mmol, 2.0 eq.) was added portion-wise, and the reaction mixture was heated to 80° C. and reacted for 16 hours. The reaction mixture was concentrated, and the residue was diluted with EtOAc/water. The organic phase was washed with brine, dried with MgSO$_4$, and concentrated to dryness. The residue was purified by column chromatography (silica gel, PE/EtOAc=20/1) to give Intermediate 1.4 (28.30 g, 78% yield) as a light-yellow oil.

Intermediate 1.4 (22.30 g, 90.2 mmol, 1.0 eq.) was dissolved in THF (200 mL) with stirring, Boc$_2$O (29.50 g, 135.2 mmol, 1.5 eq.) was added at ice-water bath temperature, then DMAP (2.18 g, 18.1 mmol, 0.2 eq.) was added portion-wise, and the reaction mixture was stirred at ambient temperature for 5 hours. The reaction mixture was diluted with EtOAc/water. The organic phase was washed with brine, dried with MgSO$_4$, and concentrated to dryness. The residue was purified by column chromatography (silica gel, PE/EtOAc=30/1) to give Intermediate 1.5 (32.05 g, 95% yield) as a white solid.

Intermediate 1.5 (6.00 g, 17.4 mmol, 1.0 eq.) was dissolved in CCl$_4$ (100 mL) with stirring, (PhCO)$_2$O (0.42 g, 1.74 mmol, 0.1 eq.) was added, then NBS (3.25 g, 18.3 mmol, 1.05 eq.) was added, and the reaction mixture was heated to 85° C. and reacted for 3 hours. The residue was purified by column chromatography (silica gel, PE/EtOAc=100/1) to give Intermediate 1.6 (6.00 g, 82% yield) as a white solid.

Intermediate 1.6 (6.00 g, 14.2 mmol, 1.0 eq.) was dissolved in MeCN (60 mL) with stirring, an aqueous solution of N-methyl-N-oxymorpholine (3.34 g, 28.4 mmol, 2.0 eq.) was added, and the reaction mixture was stirred at ambient temperature for 16 hours. The reaction mixture was diluted with EtOAc/water. The organic phase was washed with brine, dried with MgSO$_4$, and concentrated to dryness. The residue was purified by column chromatography (silica gel, PE/EtOAc=50/1) to give Intermediate 1.7 (3.50 g, 60% yield) as a white solid. $^1$H NMR (400 MHz, DMSO-d$_6$) δ (ppm) 10.39 (s, 1H), 8.27 (s, 1H), 7.80 (d, J=3.7 Hz, 1H), 6.80 (d, J=3.7 Hz, 1H), 1.57 (s, 9H).

Intermediate 1.7 (3.00 g, 11.6 mmol. 1.0 eq.) was dissolved in water (3 mL) and 1,4-dioxane (30 mL) with stirring, NaH$_2$PO$_4$ (2.19 g, 13.9 mmol, 1.2 eq.) and 2-methyl-2-butene (1.65 g, 23.2 mmol, 2.0 eq.) were added, then NaClO$_2$ (1.16 g, 11.6 mmol, 1.0 eq.) was added portion-wise at ice-water bath temperature, and the reaction mixture was stirred at ambient temperature for 3 hours. The reaction mixture was diluted with EtOAc/water. The organic phase was washed with brine, dried with MgSO$_4$, and concentrated to dryness to give Intermediate 1.8 (3.00 g, 96% yield) as a white solid.

Intermediate 1.8 (3.00 g. 8.02 mmol, 1.0 eq.) was dissolved in methanol (30 mL) with stirring, concentrated sulfuric acid (5 mL) was added dropwise, and the reaction mixture was heated to 60° C. and reacted for 16 hours. The reaction mixture was diluted with EtOAc/water. The organic phase was washed with brine, dried with MgSO$_4$, and concentrated to dryness. The residue was purified by column chromatography (silica gel, PE/EtOAc=10/1) to give Intermediate 1.9 (0.30 g, 13% yield) as a white solid. $^1$H NMR (400 MHz, DMSO-$d_6$) δ (ppm) 11.49 (brs, 1H), 8.17 (s, 1H), 7.52-7.53 (m, 1H), 6.55-6.56 (m, 1H), 3.97 (s, 3H).

Intermediate 1.9 (300 mg, 1.46 mmol, 1.0 eq.) was dissolved in DMF (5 mL) with stirring, NaH (60% dispersion in oil, 487 mg, 2.19 mmol, 1.5 eq.) was added at ice-water bath temperature, then tert-butyl 2,2-dioxo-1,2λ$^6$,3-oxathiazolidine-3-carboxylate (2.0 eq.) was added, and the reaction mixture was stirred at ambient temperature for 1 hour. The reaction mixture was diluted with EtOAc/water. The organic phase was washed with brine, dried with MgSO$_4$, and concentrated to dryness to give a crude intermediate 1.10 (>100% yield), which was directly used in the next step without further purification.

Intermediate 1.10 (crude) was dissolved in HCl/1,4-dioxane solution (5 mL) and stirred at ambient temperature for 30 minutes. The reaction mixture was concentrated to dryness to give a crude intermediate 1.11 (540 mg, >100% yield), which was directly used in the next step without further purification.

Intermediate 1.11 (540 mg, crude) and K$_2$CO$_3$ (450 mg, 3.26 mmol, 2.0 eq.) were dissolved in methanol (5 mL) and heated to reflux for 5 hours. The reaction mixture was concentrated to dryness, and the residue was purified by column chromatography (silica gel, PE/EtOAc=10/1) to give Intermediate 1.12 (300 mg, 61% yield) as a white solid. $^1$H NMR (400 MHz, DMSO-$d_6$) δ (ppm) 8.54 (t, J=6.8 Hz, 1H), 8.10 (s, 1H), 7.49 (d, J=3.2 Hz, 1H), 6.54 (d, J=3.2 Hz, 1H), 4.29-4.31 (m, 2H), 3.52-3.56 (m, 2H).

Intermediate 1.12 (300 mg, 1.0 mmol, 1.0 eq.) was dissolved in DMF (5 mL) with stirring, t-BuOK (170 mg, 1.5 mmol, 1.5 eq.) was added, and the resulting mixture was stirred for another 10 minutes. 2-(benzyloxy)-3-(chloromethyl)-4-methoxy-6-methylpyridine (305 mg, 1.1 mmol, 1.1 eq.) was added, and the resulting mixture was stirred for another 3 hours. The reaction mixture was diluted with EtOAc/water. The organic phase was washed with brine, dried with MgSO$_4$, and concentrated to dryness. The residue was purified by column chromatography (silica gel, PE/EtOAc=10/1) to give Intermediate 1.13 (220 mg, 41% yield) as a yellow solid.

Intermediate 1.13 (200 mg, 0.37 mmol, 1.0 eq.) and 3,5-dimethylisoxazol-4-boronic acid pinacol ester (126 mg, 0.56 mmol, 1.5 eq.) were dissolved in 1,4-dioxane (3 mL) with stirring, K$_3$PO$_4$ (236 mg, 1.11 mmol, 3.0 eq.) and a catalytic amount of Pd(dppf)Cl$_2$ were added, and the reaction mixture was heated to 90° C. and reacted for 1 hour. The reaction mixture was concentrated to dryness, and the residue was purified by column chromatography (silica gel, PE/EtOAc=5/1) to give Intermediate 1.14 (103 mg, 50% yield) as a white solid.

Intermediate 1.14 (103 mg, 0.18 mmol, 1.0 eq.) was dissolved in DMF (5 mL) with stirring, TFA (1 mL) was added, and the reaction mixture reacted at ambient temperature for 3 hours. The reaction mixture was concentrated to dryness and diluted with DCM/saturated NaHCO$_3$. The organic phase was washed with brine, dried with MgSO$_4$, and concentrated to dryness. The residue was purified by column chromatography (silica gel, DCM/MeOH=30/1) to give Compound 1 (29 mg, 34% yield) as a white solid. $^1$H NMR (400 MHz, DMSO-$d_6$) δ (ppm) 11.58 (br, 1H), 7.64 (s, 1H), 7.46 (d, J=3.2 Hz, 1H), 6.55 (d, J=3.2 Hz, 1H), 6.16 (s, 1H), 4.62 (br, 2H), 4.19 (br, 2H), 3.81 (s, 3H), 3.65 (m, 2H), 2.23-2.24 (m, 6H), 2.06 (s, 3H).

Example 2 10-chloro-9-(ethyl(oxetan-3-yl)amino)-2-((4-methoxy-6-methyl-2-oxo-1,2-dihydropyridin-3-yl)methyl)-3,4-dihydro-[1,4]diazepino[6,7,1-HI]indol-1(2H)-one (2)

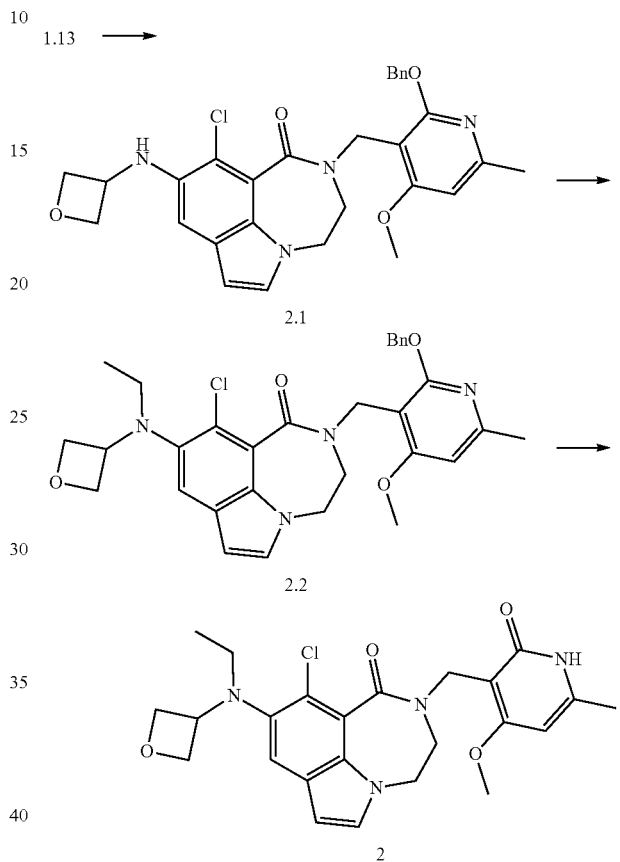

Intermediate 1.13 (300 mg, 0.55 mmol, 1.0 eq.) and oxetane-3-amine (83 mg, 1.11 mmol, 2.0 eq.) were dissolved in 1,4-dioxane (5 mL) with stirring, catalytic amounts of Pd(dba)$_2$ and XPhos were added, then solid Cs$_2$CO$_3$ (542 mg, 1.67 mmol, 3.0 eq.) was added, and the mixture was stirred to reflux under a nitrogen atmosphere for 2 hours. The reaction mixture was diluted with water and extracted with EtOAc. The organic phase was washed with brine, dried with MgSO$_4$, and concentrated to dryness. The residue was purified by column chromatography (silica gel, PE/EtOAc=3/1) to give Intermediate 2.1 (200 mg, 68% yield) as a yellow solid.

Intermediate 2.1 (200 mg, 0.38 mmol, 1.0 eq.) was dissolved in DMF (5 mL) under stirring, NaH (60%, 18 mg, 0.75 mmol, 2.0 eq.) was added portion-wise at ice-water bath temperature and stirred for 20 minutes. EtI (117 mg, 0.75 mmol, 2.0 eq.) was added, and the reaction mixture was stirred at ambient temperature for 16 hours. The reaction mixture was diluted with water and extracted with EtOAc. The organic phase was washed with brine, dried with MgSO$_4$, and concentrated to dryness to give a crude intermediate 2.2 (250 mg, >100% yield) as a yellow oil, which was directly used in the next step without further purification.

Compound 2 was prepared by using a synthesis procedure similar to the synthesis procedure of Compound 1 in Example 1 and with Intermediate 2.2 as a starting material. $^1$H NMR (400 MHz, DMSO-d$_h$) δ (ppm) 11.56 (br, 1H), 7.38 (s, 1H), 7.35 (d, J=3.2 Hz, 1H), 6.43 (d, J=3.1 Hz, 1H), 6.16 (s, 1H), 4.56 (brs, 5H), 4.32 (brs, 2H), 4.12 (brs, 2H), 3.82 (s, 3H), 3.59 (m, 2H), 3.01 (q, J=6.6 Hz, 2H), 2.22 (s, 3H), 0.88 (t, J=6.6 Hz, 3H).

Example 3  10-chloro-9-(3,5-dimethylisoxazol-4-yl)-2-((4-methoxy-6-methyl-2-oxo-1,2-dihydropyridin-3-yl)methyl)-3,4,6,7-tetrahydro-[1,4]diazepino[6,7,1-HI]indol-1(2H)-one (3)

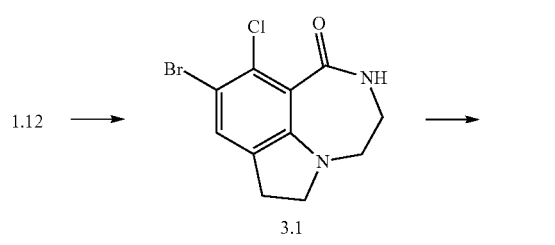

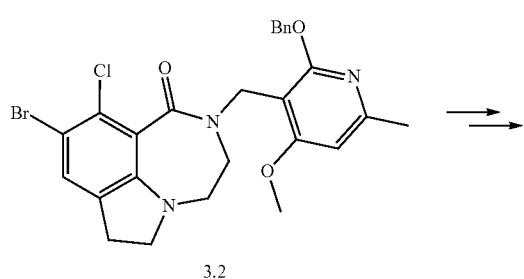

Intermediate 1.12 (500 mg, 1.67 mmol, 1.0 eq.) was dissolved in AcOH (5 mL) with stirring, solid NaBH$_3$CN (316 mg, 5.02 mmol, 3.0 eq.) was added portion-wise, and the reaction mixture reacted at ambient temperature for 16 hours. The reaction mixture was treated with saturated Na$_2$CO$_3$ until pH=8 was reached. The mixture was extracted with EtOAc, dried with MgSO$_4$, and concentrated to dryness to give crude intermediate 3.1 (350 mg, 70% yield) as a yellow solid, which was directly used in the next step without further purification.

Compound 3 was prepared by using a synthesis procedure similar to the synthesis procedure of Compound 1 in Example 1 and with Intermediate 3.1 as a starting material. $^1$H NMR (400 MHz, DMSO-d$_6$) δ (ppm) 11.51 (s, 1H), 6.99 (s, 1H), 6.13 (s, 1H), 4.49 (s, 1H), 3.79 (s, 3H), 3.51 (t, J=8.7 Hz, 2H), 3.39-3.40 (m, 2H), 3.24-3.25 (m, 2H), 2.91-2.99 (m, 2H), 2.22 (s, 3H), 2.21 (s, 3H), 2.05 (s, 3H).

Example 4  10-chloro-2-((4-methoxy-6-methyl-2-oxo-1,2-dihydropyridin-3-yl)methyl)-9-(1,3,5-trimethyl-1H-pyrazol-4-yl)-3,4-dihydro-[1,4]diazepino[6,7,1-H1]indol-1(2H)-one (4)

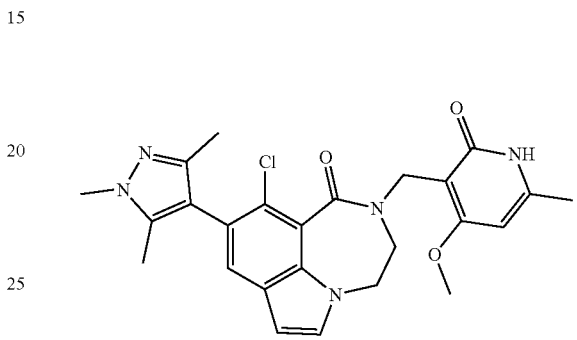

Compound 4 was prepared by using a synthesis procedure similar to the synthesis procedure of Compound 1 in Example 1 and with 1,3,5-trimethyl-4-(4,4,5,5-tetramethyl-1,3,2-dioxaborolan-2-yl)-1H-pyrazole as a starting material. $^1$H NMR (400 MHz, DMSO-d$_6$) δ (ppm) 11.57 (s. 1H), 7.48 (s, 1H), 7.40 (d, J=3.2 Hz, 1H), 6.50 (d, J=3.2 Hz, 1H), 6.16 (s, 1H), 4.61 (brs, 2H), 4.18 (brs, 2H), 3.81 (s, 3H), 3.72 (s, 3H), 3.64 (s, 2H), 2.23 (s, 3H), 2.04 (s, 3H), 1.96 (s, 3H).

Example 5  10-chloro-9-(1,4-dimethyl-1H-pyrazol-5-yl)-2-((4-methoxy-6-methyl-2-oxo-1,2-dihydropyridin-3-yl)methyl)-3,4-dihydro-[1,4]diazepino[6,7,1-HI]indol-1(2H)-one (5)

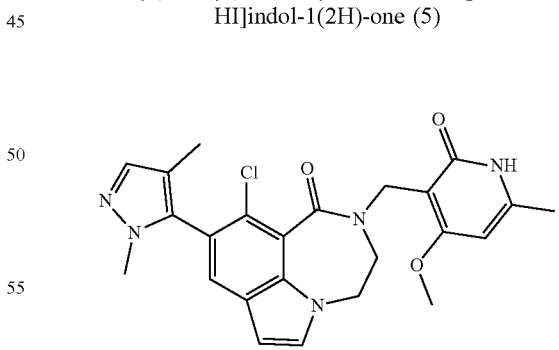

Compound 5 was prepared by using a synthesis procedure similar to the synthesis procedure of Compound 1 in Example 1 and with 1,4-dimethyl-5-(4,4,5,5-tetramethyl-1,3,2-dioxaborolan-2-yl)-1H-pyrazole as a starting material. $^1$H NMR (400 MHz, DMSO-d$_6$) δ (ppm) 11.59 (s, 1H), 7.63 (s, 1H), 7.48 (d, J=3.1 Hz, 1H), 7.33 (s, 1H), 6.58 (d, J=3.1 Hz, 1H), 6.16 (s, 1H), 4.63 (brs, 2H), 4.21 (brs, 2H), 3.81 (s, 3H), 3.67 (s, 2H), 3.53 (s, 3H), 2.23 (s, 3H), 1.84 (s, 3H).

Example 6 7,10-dichloro-9-(1,4-dimethyl-1H-pyrazol-5-yl)-2-((4-methoxy-6-methyl-2-oxo-1,2-dihydropyridin-3-yl)methyl)-3,4-dihydro-[1,4]diazepino[6,7,1-HI]indol-1(2H)-one (6)

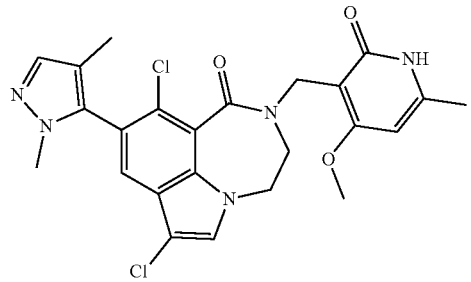 [SMILES: COc1cc(C)[nH]c(=O)c1CN1CCn2cc(Cl)c3cc(-c4c(C)cnn4C)c(Cl)c(c32)C1=O]

Compound 6 was prepared by using a synthesis procedure similar to the synthesis procedure of Compound 5 in Example 5 and with 9-bromo-7,10-dichloro-2-((4-methoxy-6-methyl-2-oxo-1,2-dihydropyridin-3-yl)methyl)-3,4-dihydro-[1,4]diazepino[6,7,1-HI]indol-1(2H)-one as a starting material. $^1$H NMR (400 MHz, DMSO-$d_6$) δ (ppm) 11.58 (s, 1H), 7.74 (s, 1H), 7.53 (s, 1H), 7.35 (s, 1H), 6.16 (s, 1H), 4.62 (brs, 2H), 4.19 (brs, 2H), 3.82 (s, 3H), 3.68 (s, 2H), 3.53 (s, 3H), 2.23 (s. 3H), 1.84 (s, 3H).

Example 7 10-chloro-9-(1-(2-hydroxyethyl)-3,5-dimethyl-1H-pyrazol-4-yl)-2-((4-methoxy-6-methyl-2-oxo-1,2-dihydropyridin-3-yl)methyl)-3,4-dihydro-[1,4]diazepino[6,7,1-HI]indol-1(2H)-one (7)

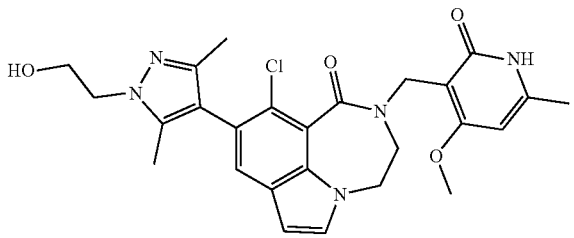 [SMILES: COc1cc(C)[nH]c(=O)c1CN1CCn2ccc3cc(-c4c(C)nn(CCO)c4C)c(Cl)c(c32)C1=O]

Compound 7 was prepared by using a synthesis procedure similar to the synthesis procedure of Compound 1 in Example 1 and with 2-(3,5-dimethyl-4-(4,4,5,5-tetramethyl-1,3,2-dioxaborolan-2-yl)-1H-pyrazol-1-yl)ethan-1-ol as a starting material. $^1$H NMR (400 MHz, DMSO-$d_6$) δ (ppm) 11.58 (s, 1H). 7.48 (s, 1H), 7.41 (s, 1H), 6.51 (s, 1H). 6.16 (s, 1H), 4.88 (m, 1H). 4.62 (m, 2H). 4.17 (m, 2H), 4.05-4.10 (m, 2H), 3.81 (s, 3H), 3.74-3.75 (m, 2H), 3.64 (s, 2H), 2.23 (s, 3H), 2.07 (s, 3H), 1.98 (s, 3H).

Example 8 2-(4-(10-chloro-2-((4-methoxy-6-methyl-2-oxo-1,2-dihydropyridin-3-yl)methyl)-1-oxo-1,2,3,4-tetrahydro-[1,4]diazepino[6,7,1-HI]indol-9-yl)-3,5-dimethyl-1H-pyrazol-1-yl)acetonitrile (8)

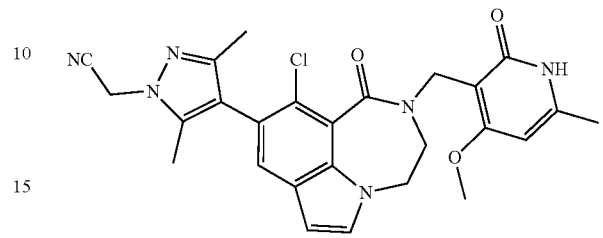

Compound 8 was prepared by using a synthesis procedure similar to the synthesis procedure of Compound 1 in Example 1 and with 2-(3,5-dimethyl-4-(4,4,5,5-tetramethyl-1,3,2-dioxaborolan-2-yl)-1H-pyrazol-1-yl)acetonitrile as a starting material. $^1$H NMR (400 MHz, DMSO-$d_6$) δ (ppm) 11.57 (s, 1H), 7.54 (s, 1H), 7.43 (d, J=3.2 Hz, 1H), 6.52 (d, J=3.2 Hz, 1H), 6.16 (s, 1H), 5.42 (s, 2H), 4.62 (brs, 2H), 4.18 (brs, 2H), 3.82 (s, 3H), 3.65 (s, 2H), 2.23 (s, 3H), 2.12 (s, 3H), 1.99 (s, 3H).

Example 9 10-chloro-9-(methoxy(oxetan-3-yl)methyl)-2-((4-methoxy-6-methyl-2-oxo-1,2-dihydropyridin-3-yl)methyl)-3,4-dihydro-[1,4]diazepino[6,7,1-HI]indol-1(2H)-one (9)

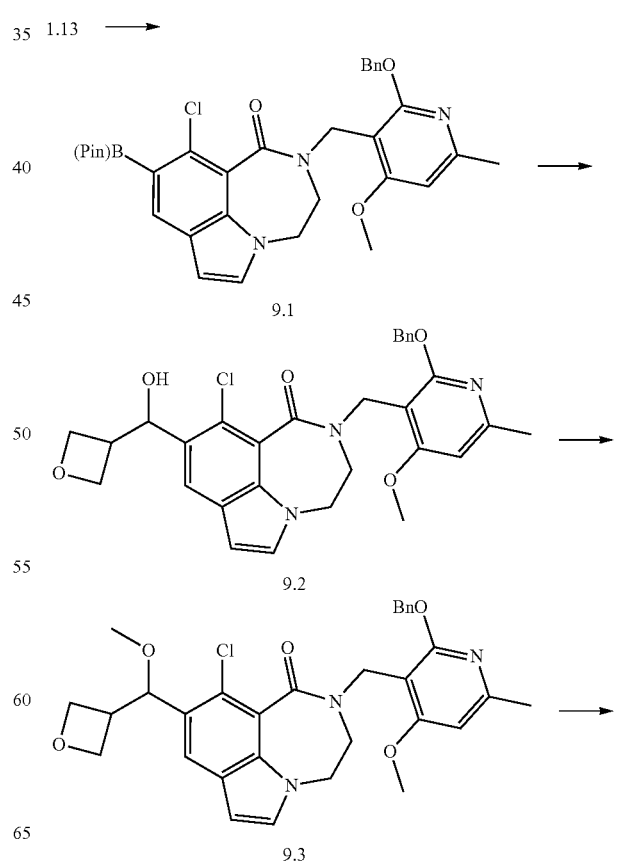

-continued

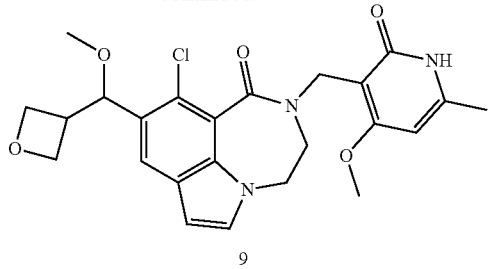

9

Intermediate 1.13 (500 mg, 0.92 mmol, 1.0 eq.) and B₂(pin)₂ (351 mg, 1.38 mmol, 1.5 eq.) were dissolved in 1,4-dioxane (10 mL) with stirring, AcOK (272 mg, 2.77 mmol, 3.0 eq.) was added, and a catalytic amount of Pd(dppf)Cl₂ was added, and the reaction mixture was heated to reflux under a nitrogen atmosphere for 12 hours. The reaction mixture was diluted with water and extracted with EtOAc. The organic phase was washed with brine, dried with MgSO₄, and concentrated to dryness. The residue was purified by column chromatography (silica gel, PE/EtOAc=1/1) to give Intermediate 9.1 (500 mg, 92% yield) as a crude white solid.

Intermediate 9.1 (500 mg, 0.85 mmol, 1.0 eq.) and oxetane-3-formaldehyde (110 mg, 1.27 mmol, 1.5 eq.) were dissolved in THF (10 mL) with stirring, solid K₂CO₃ (352 mg, 2.55 mmol, 3.0 eq.) was added, and catalytic amounts of PdCl₂ and tris(1-naphthyl)phosphine were added. The reaction mixture was heated to reflux under a nitrogen atmosphere for 12 hours. The reaction mixture was diluted with water and extracted with EtOAc. The organic phase was washed with brine, dried with MgSO₄, and concentrated to dryness. The residue was purified by column chromatography (silica gel, DCM/MeOH=50/1) to give Intermediate 9.2 (150 mg, 32% yield) as a yellow solid.

Intermediate 9.2 (150 mg, 0.27 mmol, 1.0 eq.) and MeI (59 mg, 0.41 mmol, 1.5 eq.) were dissolved in THF (5 mL) with stirring, solid t-BuOK (46 mg, 0.41 mmol, 1.5 eq.) was added at ice-water bath temperature, and the reaction mixture was stirred for another hour. The reaction mixture was diluted with water and extracted with EtOAc. The organic phase was washed with brine, dried with MgSO₄, and concentrated to dryness to give a crude intermediate 9.3 (150 mg, 98% yield) as a yellow oil, which was directly used in the next step without further purification.

Intermediate 9.3 (20 mg, 0.04 mmol, 1.0 eq.) was dissolved in THF (5 mL) with stirring, a catalytic amount of Pd(OH)₂ were added, and the reaction mixture was stirred under a hydrogen atmosphere at ambient temperature for 12 hours. The reaction mixture was filtered to remove the catalyst, and the filtrate was concentrated to dryness. The residue was purified by column chromatography (silica gel, DCM/MeOH=10/1) to give Compound 9 (10 mg, 62% yield) as a white solid. ¹H NMR (400 MHz, DMSO-d₆) δ (ppm) 11.56 (s, 1H), 7.68 (s, 1H), 7.40 (d, J=3.1 Hz, 1H), 6.54 (d, J=3.2 Hz, 1H), 6.16 (s, 1H), 5.08 (d, J=6.6 Hz, 1H), 4.43-4.64 (m, 6H), 4.14 (brs, 2H), 3.81 (s, 3H), 3.60 (s, 2H), 3.32-3.38 (m, 1H), 3.21 (s, 3H), 2.22 (s, 3H).

Example 10 (R)-10-chloro-9-(methoxy(oxetan-3-yl)methyl)-2-((4-methoxy-6-methyl-2-oxo-1,2-dihydropyridin-3-yl)methyl)-3,4-dihydro-[1,4]diazepino[6,7,1-HI]indol-1(2H)-one (10) and (S)-10-chloro-9-(methoxy(oxetan-3-yl)methyl)-2-((4-methoxy-6-methyl-2-oxo-1,2-dihydropyridin-3-yl)methyl)-3,4-dihydro-[1,4]diazepino[6,7,1-HI]indol-1(2H)-one (11)

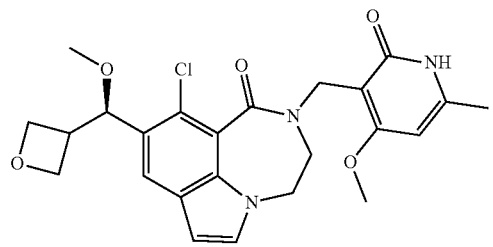

10

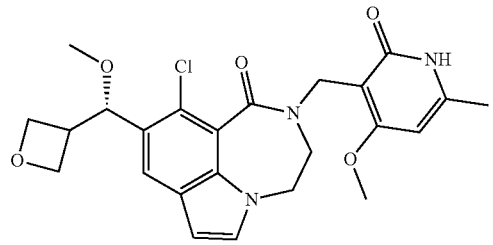 [SMILES: CCN(c1cc2ccn3c2c(c1Cl)C(=O)N(Cc1c(OC)cc(C)[nH]c1=O)CC3)C1COC1]

11

Compound 10 and compound 11 were prepared by chiral separation of Compound 9.

Chromatographic column: CHIRALCEL OZ-H (OZH0CD-VC005)

Column size: 0.46 cm I.D.*15 cm L

Sample injection: 10.0 uL

Mobile phase: MeOH=100%

Flow rate: 1.0 mL/min

Wavelength: UV 214 nm

HPLC equipment: Shimadzu LC-20AD

¹H NMR (400 MHz, DMSO-d₆) δ (ppm) 11.56 (s, 1H), 7.68 (s, 1H), 7.40 (d, J=3.1 Hz, 1H), 6.54 (d, J=3.2 Hz, 1H). 6.16 (s, 1H), 5.08 (d, J=6.6 Hz, 1H), 4.43-4.64 (m, 6H), 4.14 (brs, 2H), 3.81 (s, 3H), 3.60 (s, 2H), 3.32-3.38 (m, 1H), 3.21 (s, 3H), 2.22 (s, 3H); e.e. >98%; Compound 10: retention time 11.56 min, [α]=76.13° (MeOH, c=0.790 g/100 mL); Compound 11: retention time 8.86 min, [α]=−86.31° (MeOH, c=0.723 g/100 mL).

Example 11 5-chloro-4-(3,5-dimethylisoxazol-4-yl)-7-((4-methoxy-6-methyl-2-oxo-1,2-dihydropyridin-3-yl)methyl)-8,9-dihydro-[1,4]diazepino[6,7,1-HI]indazol-6(7H)-one (12)

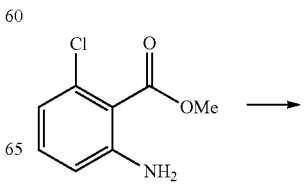

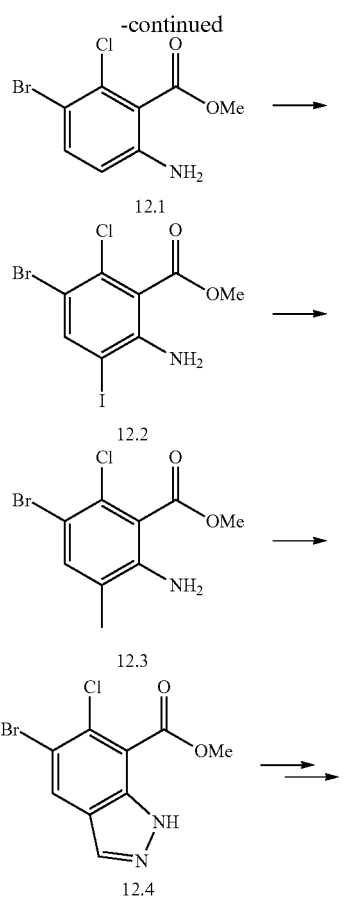

1.03 mmol, 3.0 eq.) were dissolved in a mixed solvent of 1,4-dioxane (5 mL) and water (1 mL) with stirring, a catalytic amount of Pd(dppf)Cl$_2$ was added, and the reaction mixture was heated to reflux under a nitrogen atmosphere for 4 hours. The reaction mixture was diluted with water and extracted with EtOAc. The organic phase was washed with brine, dried with MgSO$_4$, and concentrated to dryness. The residue was purified by column chromatography (silica gel, PE/EtOAc=10/1) to give Intermediate 12.3 (100 mg).

Intermediate 12.3 (100 mg, 0.36 mmol, 1.0 eq.) was dissolved in chloroform (5 mL) with stirring, AcOK (11 mg, 0.11 mmol, 0.3 eq.) and Ac$_2$O (84 mg, 0.83 mmol, 2.3 eq.) were added, and the reaction mixture was heated to reflux. Isoamyl nitrite (92 mg. 0.79 mmol, 2.2 eq.) was added, and the reaction mixture was stirred until the reaction was complete. The reaction mixture was poured into cold water and extracted with DCM. The organic phase was washed with brine, dried over MgSO$_4$, and concentrated to dryness to give a crude intermediate 12.4 (100 mg), which was directly used in the next step without further purification.

Compound 12 was prepared by using a synthesis procedure similar to the synthesis procedure of Compound 1 in Example 1. $^1$H NMR (400 MHz, DMSO-d$_6$) δ (ppm) 11.58 (brs, 1H), 8.22 (s, 1H), 7.93 (s, 1H), 6.17 (s, 1H), 4.64 (s, 2H), 4.39 (s, 2H), 3.73-3.81 (m, 5H), 2.23-2.26 (m, 6H), 2.06 (s, 3H).

Example 12 5-chloro-4-(3,5-dimethylisoxazol-4-yl)-7-((4-methoxy-6-methyl-2-oxo-1,2-dihydropyridin-3-yl)methyl)-8,9-dihydro-2,7,9a-triazabenzo[cd]azulen-6(7H)-one (13)

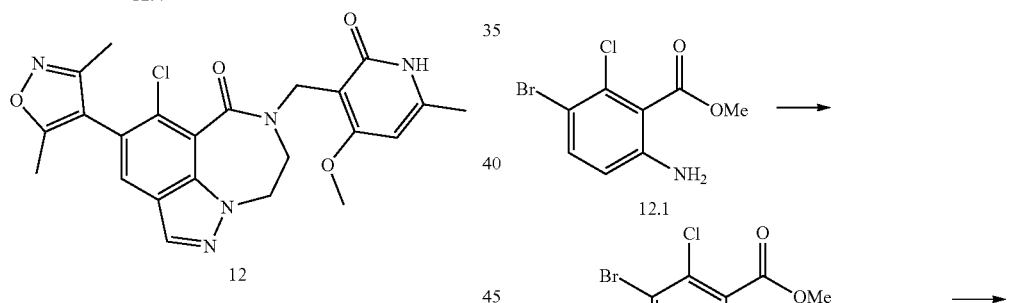

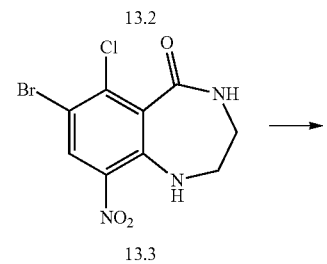

Methyl 2-amino-6-chlorobenzoate (20.00 g, 110 mmol. 1.0 eq.) was dissolved in DMF (150 mL) with stirring, NBS (23.22 g, 130 mmol, 1.2 eq.) was added portion-wise at ice-water bath temperature, and the reaction mixture was stirred at ambient temperature for 3 hours. The reaction mixture was poured into water and extracted with EtOAc. The organic phase was washed with brine, dried with MgSO$_4$, and concentrated to dryness. The residue was purified by column chromatography (silica gel, PE/EtOAc=9/1) to give Intermediate 12.1 (25.00 g) as a brown oil.

Intermediate 12.1 (20.00 g, 75.61 mmol, 1.0 eq.) was dissolved in AcOH (100 mL). NIS (20.41 g, 90.73 mmol, 1.2 eq.) was added, and the mixture was stirred at ambient temperature for 16 hours. The reaction mixture was poured into cold water and filtered to collect the precipitate. The resulting solid was dissolved in DCM, dried with MgSO$_4$, and concentrated to dryness to give a crude intermediate 12.2 (20.00 g) as a brown solid, which was directly used in the next step without further purification.

Intermediate 12.2 (100 mg, 0.34 mmol, 1.0 eq.), MeB(OH)$_2$ (103 mg, 0.41 mmol, 1.2 eq.), and K$_3$PO$_4$ (219 mg.

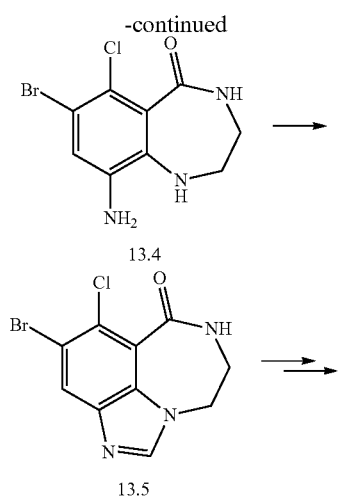

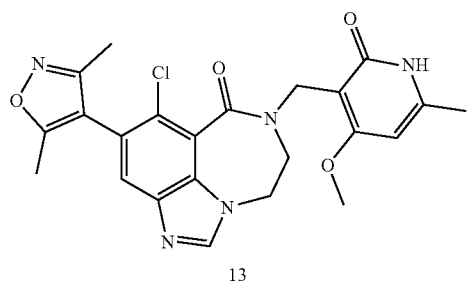

Intermediate 12.1 (5.00 g, 18.9 mmol, 1.0 eq.) and tert-butyl(2-oxoethyl)carbamate (4.65 g, 28.36 mmol, 1.5 eq.) were dissolved in DCE (25 mL) with stirring, NaBH(OAc)$_3$ (12.01 g, 56.71 mmol, 3.0 eq.) was added, and the reaction mixture was stirred at ambient temperature for 16 hours. The reaction mixture was poured into cold water and extracted with DCM. The organic phase was washed with brine, dried with MgSO$_4$, and concentrated to dryness. The residue was purified by column chromatography (silica gel, PE/EtOAc=6/1) to give Intermediate 13.1 (6.60 g) as a yellow oil.

Intermediate 13.1 was dissolved in DCM (10 mL) with stirring, TFA (10 mL) was added, and the reaction mixture was stirred at ambient temperature for 2 hours. The reaction mixture was concentrated to dryness. The residue was dissolved in MeOH (100 mL), and solid K$_2$CO$_3$ was added. The reaction mixture was heated to reflux for 36 hours. The reaction mixture was concentrated to dryness, and the resulting residue was treated with water. The precipitate was collected by filtration to give a crude intermediate 13.2 (100% yield), which was directly used in the next step.

Intermediate 13.2 (800 mg, 2.90 mmol, 1.0 eq.) was dissolved in TFA (10 mL) with stirring, KNO$_3$ (1.47 g, 14.5 mmol, 5.0 eq.) was added, and the resulting mixture was stirred for 4 hours. The reaction mixture was poured into cold water and extracted with DCM. The organic phase was washed with brine, dried with MgSO$_4$, and concentrated to dryness to give a crude intermediate 13.3 (1.00 g) as a brown solid.

Intermediate 13.3 (crude, 1 g) was dissolved in a mixed solvent of DMF (10 mL) and water (5 mL) with stirring, sodium dithionite (5.43 g, 43.4 mmol) was added, and the reaction mixture was heated to 70° C. and reacted for 3 hours. The reaction mixture was poured into cold water and extracted with EtOAc. The organic phase was washed with brine, dried with MgSO$_4$, and concentrated to dryness to give a crude intermediate 13.4 (1.80 g) as a brown solid.

Intermediate 13.4 (crude, 1.80 g) was added to trimethyl orthoformate with stirring and heated to reflux overnight. The reaction mixture was concentrated to dryness to give a crude intermediate 13.5 (yield>100%), which was directly used in the next step without further purification.

Compound 13 was prepared by using a synthesis procedure similar to the synthesis procedure of Compound 1 in Example 1. $^1$H NMR (400 MHz, DMSO-d$_6$) δ (ppm) 12.11 (brs, 1H), 7.93 (s, 1H), 7.71 (s, 1H), 5.99 (s, 1H), 4.87-5.00 (m, 2H), 4.23-4.33 (m, 2H), 4.06-4.10 (m, 1H), 3.92 (s, 3H), 3.74-3.79 (m, 1H), 2.14-2.38 (m, 9H).

Example 13 9-(methoxy(oxetan-3-yl)methyl)-2-((4-methoxy-6-methyl-2-oxo-1,2-dihydropyridin-3-yl)methyl)-10-methyl-3,4-dihydro-[1,4]diazepino[6,7,1-HI]indol-1(2H)-one (14)

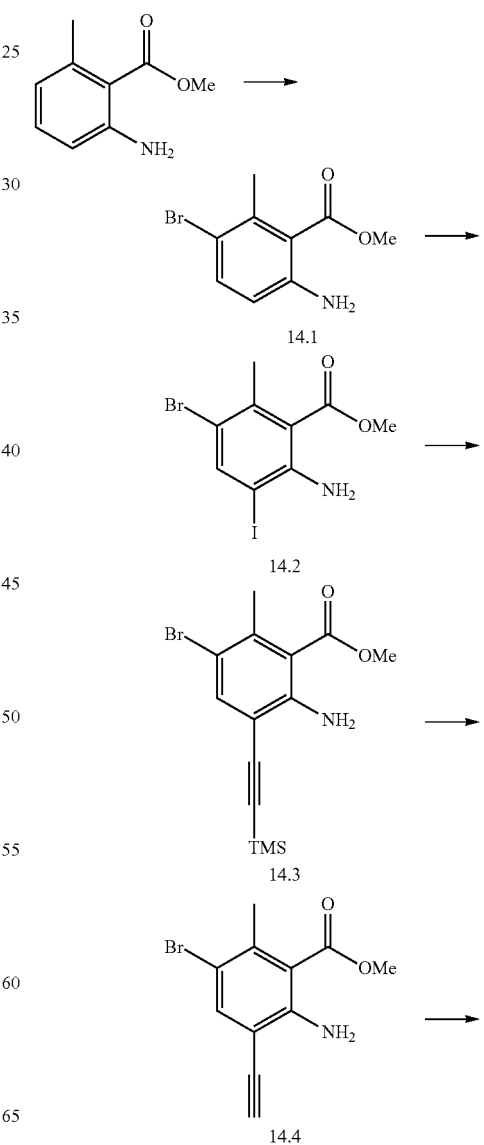

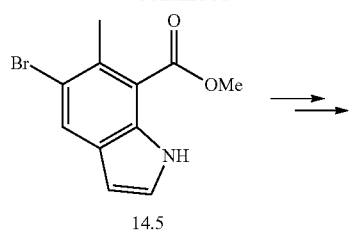

14.5

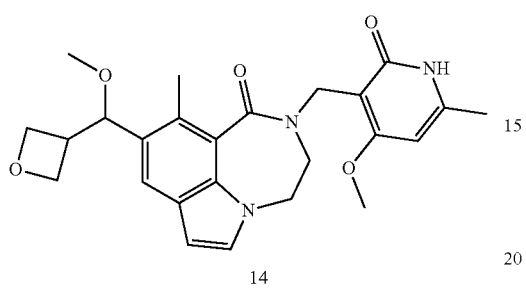

14

Compound 14 was prepared by using a synthesis procedure similar to the synthesis procedure of Compound 1 in Example 1 and with methyl 2-amino-6-methyl-benzoate as a starting material. $^1$H NMR (400 MHz, DMSO-d$_6$) δ (ppm) 11.57 (brs, 1H), 7.56 (s, 1H), 7.26 (d, J=3.0 Hz, 1H), 6.44 (d, J=3.0 Hz, 1H), 6.16 (s, 1H), 4.32-4.87 (m, 7H), 4.13 (brs, 2H), 3.81 (s, 3H), 3.56 (brs, 2H), 3.38-3.43 (m, 1H), 3.15 (s, 3H), 2.52 (s. 3H), 2.25 (s. 3H).

Example 14 9-(3,5-dimethylisoxazol-4-yl)-2-((4-methoxy-6-methyl-2-oxo-1,2-dihydropyridin-3-yl)methyl)-10-methyl-3,4-dihydro-[1,4]diazepino[6,7,1-HI]indol-1(2H)-one (15)

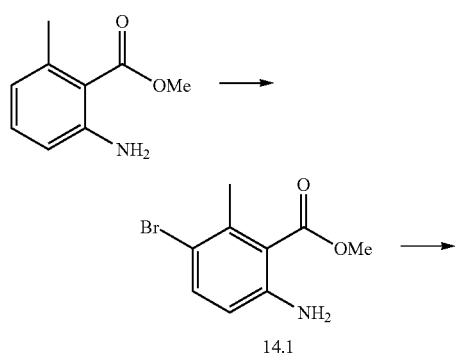

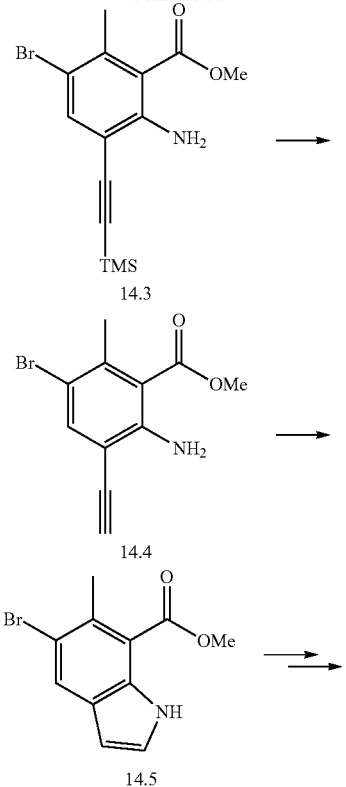

Compound 15 was prepared by using a synthesis procedure similar to the synthesis procedure of Compound 13 in Example 14. H NMR (400 MHz, DMSO-d$_6$) δ (ppm) 11.57 (s, 1H), 7.43 (s, 1H)) 7.33 (d, J=3.2 Hz, 1H), 6.46 (d, J=3.2 Hz, (H), 6.16 (s, 1H), 4.64 (brs, 2H), 4.18 (brs, 2H), 3.81 (s, 3H), 3.62 (brs, 2H), 2.27 (s, 3H), 2.22 (s, 3H), 2.20 (s, 3H), 2.00 (s, 3H).

Example 15 10-chloro-9-(3,5-dimethylisoxazol-4-yl)-2-((4-methoxy-6-methyl-2-oxo-1,2-dihydropyridin-3-yl)methyl)-4-methyl-3,4-dihydro-[1,4]diazepino[6,7,1-HI]indol-1(2H)-one (16)

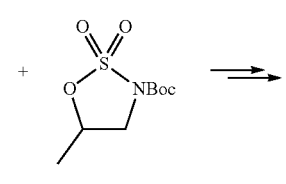

-continued

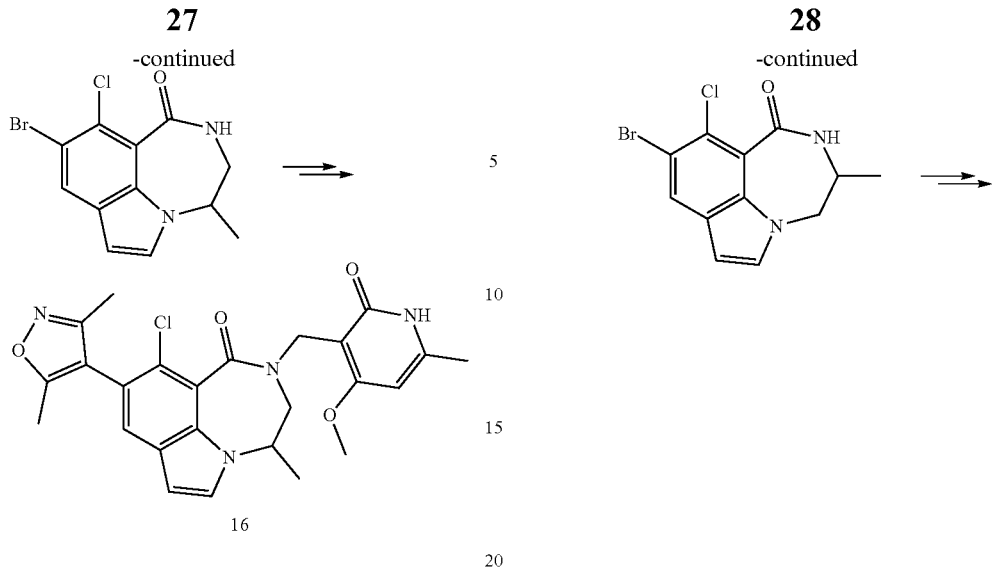

Compound 16 was prepared by using a synthesis procedure similar to the synthesis procedure of Compound 1 in Example 1 and with Intermediate 1.9 and tert-butyl 5-methyl-1,2,3-oxothiazolidine-3-carboxylate 2,2-dioxide as starting, materials. $^1$H NMR (400 MHz, DMSO-$d_6$) 7.59 (s, 1H), 7.40 (s, 1H), 6.58 (d, 1H), 6.34 (d, 1H), 5.47-5.51 (in, 1H), 4.63 (brs, 1H), 4.36-4.38 (m, 1H), 3.91 (s, 3H), 3.79 (s, 2H), 2.03-2.35 (m, 9H), 1.59 (s, 3H).

Example 16 10-chloro-9-(3,5-dimethylisoxazol-4-yl)-2-((4-methoxy-6-methyl-2-oxo-1,2-dihydropyridin-3-yl)methyl)-3-methyl-3,4-dihydro-[1,4]diazepino[6,7,1-HI]indol-1 (2H)-one (17)

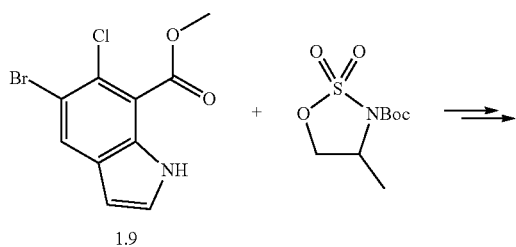

Compound 17 was prepared by using a synthesis procedure similar to the synthesis procedure of Compound 1 in Example 1 and with Intermediate 1.9 and tert-butyl 4-methyl-1,2,3-oxothiazolidine-3-carboxylate 2,2-dioxide as starting materials. $^1$H NMR (400 MHz, DMSO-$d_6$) 11.56 (s, 1H), 7.62 (s, 1H), 7.42 (6, 1H), 6.56 (s, 1H), 6.14 (s, 1H), 4.91-4.94 (m, 1H), 4.34 (brs, 3H), 4.02 (brs, 2H), 3.77 (s, 3H), 2.02-2.28 (m, 9H) 0.66 (s, 3H).

The structures and characterizations of representative compounds described herein are shown in Table 1.

TABLE 1

Structures, $^1$HNMR, and molecular weight data of representative compounds

| Compound | Structure | $^1$HNMR (400 MHz, DMSO-$d_6$) | [M + H]$^+$ |
| --- | --- | --- | --- |
| 1 |  | 11.58 (br, 1H), 7.64 (s, 1H), 7.46 (d, J = 3.2 Hz, 1H), 6.55 (d, J = 3.2 Hz, 1H), 6.16 (s, 1H), 4.62 (br, 2H), 4.19 (br, 2H), 3.81 (s, 3H), 3.65 (m, 2H), 2.23-2.24 (m, 6H), 2.06 (s, 3H) | 467 |

TABLE 1-continued

Structures, ¹HNMR, and molecular weight data of representative compounds

| Compound | Structure | ¹HNMR (400 MHz, DMSO-d₆) | [M + H]⁺ |
|---|---|---|---|
| 2 | | 11.56 (br, 1H), 7.38 (s, 1H), 7.35 (d, J = 3.2 Hz, 1H), 6.43 (d, J = 3.1 Hz, 1H), 6.16 (s, 1H), 4.56 (brs, 5H), 4.32 (brs, 2H), 4.12 (brs, 2H), 3.82 (s, 3H), 3.59 (m, 2H), 3.01 (q, J = 6.6 Hz, 2H), 2.22 (s, 3H), 0.88 (t, J = 6.6 Hz, 3H) | 471 |
| 3 | | 11.51 (s, 1H), 6.99 (s, 1H), 6.13 (s, 1H), 4.49 (s, 1H), 3.79 (s, 3H), 3.51 (t, J = 8.7 Hz, 2H), 3.39-3.40 (m, 2H), 3.24-3.25 (m, 2H), 2.91-2.99 (m, 2H), 2.22 (s, 3H), 2.21 (s, 3H), 2.05 (s, 3H) | 469 |
| 4 | | 11.57 (s, 1H), 7.48 (s, 1H), 7.40 (d, J = 3.2 Hz, 1H), 6.50 (d, J = 3.2 Hz, 1H), 6.16 (s, 1H), 4.61 (brs, 2H), 4.18 (brs, 2H), 3.81 (s, 3H), 3.72 (s, 3H), 3.64 (s, 2H), 2.23 (s, 3H), 2.04 (s, 3H), 1.96 (s, 3H) | 480 |
| 5 | | 11.59 (s, 1H), 7.63 (s, 1H), 7.48 (d, J = 3.1 Hz, 1H), 7.33 (s, 1H), 6.58 (d, J = 3.1 Hz, 1H), 6.16 (s, 1H), 4.63 (brs, 2H), 4.21 (brs, 2H), 3.81 (s, 3H), 3.67 (s, 2H), 3.53 (s, 3H), 2.23 (s, 3H), 1.84 (s, 3H) | 466 |
| 6 | | 11.58 (s, 1H), 7.74 (s, 1H), 7.53 (s, 1H), 7.35 (s, 1H), 6.16 (s, 1H), 4.62 (brs, 2H), 4.19 (brs, 2H), 3.82 (s, 3H), 3.68 (s, 2H), 3.53 (s, 3H), 2.23 (s, 3H), 1.84 (s, 3H) | 500 |
| 7 | | 11.58 (s, 1H), 7.48 (s, 1H), 7.41 (s, 1H), 6.51 (s, 1H), 6.16 (s, 1H), 4.88 (m, 1H), 4.62 (m, 2H), 4.17 (m, 2H), 4.05-4.10 (m, 2H), 3.81 (s, 3H), 3.74-3.75 (m, 2H), 3.64 (s, 2H), 2.23 (s, 3H), 2.07 (s, 3H), 1.98 (s, 3H) | 510 |

TABLE 1-continued

Structures, ¹HNMR, and molecular weight data of representative compounds

| Compound | Structure | ¹HNMR (400 MHz, DMSO-d$_6$) | [M + H]$^+$ |
|---|---|---|---|
| 8 | | 11.57 (s, 1H), 7.54 (s, 1H), 7.43 (d, J = 3.2 Hz, 1H), 6.52 (d, J = 3.2 Hz, 1H), 6.16 (s, 1H), 5.42 (s, 2H), 4.62 (brs, 2H), 4.18 (brs, 2H), 3.82 (s, 3H), 3.65 (s, 2H), 2.23 (s, 3H), 2.12 (s, 3H), 1.99 (s, 3H) | 505 |
| 9 | | 11.56 (s, 1H), 7.68 (s, 1H), 7.40 (d, J = 3.1 Hz, 1H), 6.54 (d, J = 3.2 Hz, 1H), 6.16 (s, 1H), 5.08 (d, J = 6.6 Hz, 1H), 4.43-4.64 (m, 6H), 4.14 (brs, 2H), 3.81 (s, 3H), 3.60 (s, 2H), 3.32-3.38 (m, 1H), 3.21 (s, 3H), 2.22 (s, 3H) | 472 |
| 10 | | 11.56 (s, 1H), 7.68 (s, 1H), 7.40 (d, J = 3.1 Hz, 1H), 6.54 (d, J = 3.2 Hz, 1H), 6.16 (s, 1H), 5.08 (d, J = 6.6 Hz, 1H), 4.43-4.64 (m, 6H), 4.14 (brs, 2H), 3.81 (s, 3H), 3.60 (s, 2H), 3.32-3.38 (m, 1H), 3.21 (s, 3H), 2.22 (s, 3H) | 472 |
| 11 | | 11.56 (s, 1H), 7.68 (s, 1H), 7.40 (d, J = 3.1 Hz, 1H), 6.54 (d, J = 3.2 Hz, 1H), 6.16 (s, 1H), 5.08 (d, J = 6.6 Hz, 1H), 4.43-4.64 (m, 6H), 4.14 (brs, 2H), 3.81 (s, 3H), 3.60 (s, 2H), 3.32-3.38 (m, 1H), 3.21 (s, 3H), 2.22 (s, 3H) | 472 |
| 12 | | 11.58 (brs, 1H), 8.22 (s, 1H), 7.93 (s, 1H), 6.17 (s, 1H), 4.64 (s, 2H), 4.39 (s, 2H), 3.73-3.81 (m, 5H), 2.23-2.26 (m, 6H), 2.06 (s, 3H) | 468 |
| 13 | | 12.11 (brs, 1H), 7.93 (s, 1H), 7.71 (s, 1H), 5.99 (s, 1H), 4.87-5.00 (m, 2H), 4.23-4.33 (m, 2H), 4.06-4.10 (m, 1H), 3.92 (s, 3H), 3.74-3.79 (m, 1H), 2.14-2.38 (m, 9H) | 468 |

TABLE 1-continued

Structures, ¹HNMR, and molecular weight data of representative compounds

| Compound | Structure | ¹HNMR (400 MHz, DMSO-d₆) | [M + H]⁺ |
|---|---|---|---|
| 14 | | 11.57 (brs, 1H), 7.56 (s, 1H), 7.26 (d, J = 3.0 Hz, 1H), 6.44 (d, J = 3.0 Hz, 1H), 6.16 (s, 1H), 4.32-4.87 (m, 7H), 4.13 (brs, 2H), 3.81 (s, 3H), 3.56 (brs, 2H), 3.38-3.43 (m, 1H), 3.15 (s, 3H), 2.52 (s, 3H), 2.25 (s, 3H) | 452 |
| 15 | | 11.57 (s, 1H), 7.43 (s, 1H), 7.33 (d, J = 3.2 Hz, 1H), 6.46 (d, J = 3.2 Hz, 1H), 6.16 (s, 1H), 4.64 (brs, 2H), 4.18 (brs, 2H), 3.81 (s, 3H), 3.62 (brs, 2H), 2.27 (s, 3H), 2.22 (s, 3H), 2.20 (s, 3H), 2.00 (s, 3H) | 447 |
| 16 | | 7.59 (s, 1H), 7.40 (s, 1H), 6.58 (d, 1H), 6.34 (d, 1H), 5.47-5.51 (m, 1H), 4.63 (brs, 1H), 4.36-4.38 (m, 1H), 3.91 (s, 3H), 3.79 (s, 2H), 2.03-2.35 (m, 9H), 1.59 (s, 3H) | 481 |
| 17 | | 11.56 (s, 1H), 7.62 (s, 1H), 7.42 (s, 1H), 6.56 (s, 1H), 6.14 (s, 1H), 4.91-4.94 (m, 1H), 4.34 (brs, 3H), 4.02 (brs, 1H), 3.77 (s, 3H), 2.02-2.28 (m, 9H), 0.66 (s, 3H) | 481 |

Example 17

PRC2/EZH2 Biochemical Inhibition Test

Materials

The human recombinant PRC2 complex was composed of human recombinant EZH2, AEBP2, EED, RbAp48, and SUZ12, co-expressed in an insect cell/baculovirus expression system, and purchased from Reaction Biology (Malvern, PA). The biotin-labeled histone H3 peptide (21-44) substrate was purchased from Anaspec (Fremont, CA). The HTRF detection kit including monoclonal antibody histone H3K27Mel-Eu (K) fluorescent donor and streptavidin labeled XL665 fluorescent receptor was purchased from Cisbio (Shanghai, China). S-adenosylmethionine (SAM), Tween 20, dimethyl sulfoxide (DMSO), and Tris buffer at the highest purity level were purchased from Sigma.

General Procedure for PRC2/EZH2 HTRF Enzyme Inhibition Test

The experiment was carried out in a buffer consisting of 50 mM Tris, pH 9.0, 0.1% BSA, and 0.01% Tween 20, and 1 mM DTT was added before the experiment started. 2.5 µL of a solution of a compound in 4% DMSO and 5 µL of PRC2/SAM mixed solution pre-incubated for 30 minutes were added to the buffer, and then the buffer was added to a white low-volume 384-well microtiter plate. The mixture solution was gently shaken and incubated at room temperature for 15 minutes. 2.5 µL of biotin-H3 (21-44) peptide substrate solution was added to the buffer to initiate the methyl transfer reaction. The final concentrations of PRC2, SAM, biotin-H3 peptide substrate, and DMSO were 2 ng/L, 30 µM, 10 µM, and 1%, respectively. The reaction was gently shaken at room temperature away from light for 120 minutes, and then 10 µL of monoclonal antibody histone H3K27Mel-Eu (K) fluorescent donor and streptavidin-labeled XL665 fluorescent receptor in the detection buffer from the manufacturer were added to the reaction mixture for incubation for 60 minutes. The final concentrations of these two reagents were 50 ng/ml and 62.5 nM, respectively. The plate was read on an Envision multi-template reader from PerkinElmer (Waltham MA USA) with an excitation wavelength of 320 nm and emission wavelengths of 665 and 615 nm. The $IC_{50}$ value of the inhibitor was obtained by fitting an S-shaped dose-response curve (variable slope, four parameters) of fluorescence intensities at 665 nm and 615 nm over inhibitor concentrations by using Prism 7 (La Jolla, CA).

Cell Proliferation Inhibition Test

Karpass 422 and WSUDLCL-2 cells were purchased from the European Collection of Authenticated Cell Cultures (ECACC) and the German Collection of Microorganisms and Cell Cultures (Deutsche Sammlung von Mikroorganismen und Zellkulturen, DSMZ). RMBI 1640 medium, penicillin-streptomycin, heat-inactivated fetal bovine serum (FBS), and horse serum were purchased from ThermoFisher (Waltham MA, USA). Corning 96-well cell culture plate was purchased from ThermoFisher (Waltham MA, USA).

To evaluate the inhibitory effect of the synthesized compounds on the proliferation of B-cell non-Hodgkin's lymphoma Karpass 422 and WSUDLCL-2 cells, exponentially growing cells were inoculated in RMPI1640 medium containing 20% and 10% horse serum and 1% penicillin-streptomycin at concentrations of 2000 cells/ml and 3000 cells/ml, respectively, in 96-well plates, 100 µL per well, and incubated overnight in an incubator at 37° C. and 5% $CO_2$. The compound was prepared in DMSO into a 10-point, 3-fold series diluent, starting at 6 mM. 1 µL of DMSO solution from a compound reserve plate was added to 99 µL of cell culture medium (the final maximum concentration of the compound in the assay was 30 µM and the final concentration of DMSO was 0.5%). 100 µL of compound solution from the medium was added to each well of the Karpass422 cell plate. After the addition of the compound solution, the assay plate was incubated at 37° C. and 5% $CO_2$ for 12 days. During the incubation, the cell culture medium was replaced with the cell culture medium having the newly dissolved test compound every 4 days. After 100 µL of the old medium was removed from the cell plate, 100 µL of medium having dissolved test compound was added to the assay plate, which was prepared by adding 1 µL of compound DMSO series solution to 199 µL of cell medium with the same layout as the original preparation layout. Cell viability was measured by using cell count kit-8 (CCK8) purchased from Beyotime Biotechnology (Shanghai, China). 20 µL of CCK8 reagent was added to each well of the assay plate and incubated at 37° C. for 2 hours. The O.D. at 450 nm was read by using a FlexStation 3 microplate reader (Molecular Devices, Sunnyvale, CA 94089 USA). The concentration ($IC_{50}$ value) at which the compound inhibited cell survival by 50% was determined by using an S-shaped dose-response model (variable slope, four parameters) in Prism 7 (La Jolla, CA).

The results of representative compounds described herein are shown in Table 2.

TABLE 2

Enzyme inhibitory activity against wild-type PRC2/EZH2 and cell growth inhibitory activity against Karpas422 and WSUDLCL-2 B-cell non-Hodgkin's lymphoma cell lines

| Compound | Wild-type PRC2/EZH2 $IC_{50}$ (nM) | WSUDLCL-2 $IC_{50}$ (nM) | Karpas422 $IC_{50}$ (nM) |
| --- | --- | --- | --- |
| 1 | 4.5 | 3.8 | 52 |
| 2 | 3.8 | / | / |
| 3 | 19.9 | / | / |
| 4 | 2532 | / | / |
| 5 | 253 | / | / |
| 6 | 1117 | / | / |
| 7 | 3651 | / | / |
| 8 | 1087 | / | / |
| 9 | 21.5 | / | / |
| 10 | 7.2 | 2.4 | 11.4 |
| 11 | 557 | 104 | 934 |
| 12 | / | 11.0 | 87.6 |
| 13 | / | 56.1 | 359 |
| 14 | 11.8 | 4.8 | 28.7 |
| 15 | 17.8 | 1.2 | 50.1 |
| 16 | / | 4.6 | 158 |
| 17 | 14.0 | 1.2 | 35.0 |

What is claimed is:

1. A compound represented by Formula (I) or a pharmaceutically B acceptable salt, ester, solvate, hydrate or isomer thereof:

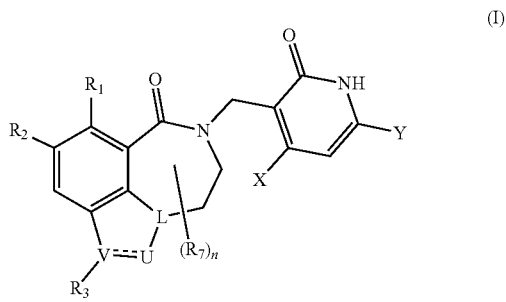

(I)

wherein $R_1$ is selected from hydrogen, halogen, $C_1$-$C_6$ alkyl, hydroxyl, cyano or amino;

$R_2$ is selected from $-CR_4R_5$, $-NR_4R_5$, 4-15-membered heterocyclyl, $C_6$-$C_{10}$ aryl or 5-14-membered heteroaryl, wherein the heterocyclyl, aryl or heteroaryl is optionally substituted by one or more $R_6$, and $R_6$ is selected from halogen, hydroxyl, cyano, amino or $C_1$-$C_6$ alkyl optionally substituted by hydroxyl or cyano;

$R_3$ is selected from hydrogen, halogen, $C_1$-$C_6$ alkyl, hydroxyl, cyano or amino;

$R_4$ and $R_5$ are each independently selected from $C_1$-$C_6$ alkyl, $C_1$-$C_6$ alkoxy or 4-15-membered heterocyclyl;

U, V, and L are each independently selected from C or N, and at least one of U, V or L is N;

X and Y are each independently selected from $C_1$-$C_6$ alkyl, $C_1$-$C_6$ fluoroalkyl, $C_1$-$C_6$ alkoxy or $C_1$-$C_6$ fluoroalkoxy;

$R_7$ is selected from hydrogen, halogen, $C_1$-$C_6$ alkyl, hydroxyl, cyano or amino;

n=0, 1 or 2; and

===== represents a single bond or a double bond.

2. The compound according to claim 1, wherein Formula (I) is Formula (Ia):

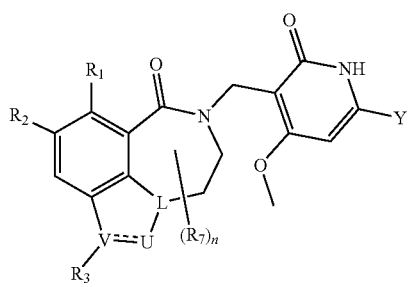

(Ia)

wherein R₁ is selected from hydrogen, halogen, $C_1$-$C_6$ alkyl, hydroxyl, cyano or amino;

R₂ is selected from —CR₄R₅, —NR₄R₅, 4-15-membered heterocyclyl, $C_6$-$C_{10}$ aryl or 5-14-membered heteroaryl, wherein the heterocyclyl, aryl or heteroaryl is optionally substituted by one or more R₆, and R₆ is selected from halogen, hydroxyl, cyano, amino or $C_1$-$C_6$ alkyl optionally substituted by hydroxyl or cyano;

R₃ is selected from hydrogen, halogen, $C_1$-$C_6$ alkyl, hydroxyl, cyano or amino;

R₄ and R₅ are each independently selected from $C_1$-$C_6$ alkyl, $C_1$-$C_6$ alkoxy or 4-15-membered heterocyclyl;

U, V, and L are each independently selected from C or N, and at least one of U, V or L is N;

R₇ is selected from hydrogen, halogen, $C_1$-$C_6$ alkyl, hydroxyl, cyano or amino;

n=0, 1 or 2; and

===== represents a single bond or a double bond.

3. The compound according to claim 1, wherein

R₁ is selected from halogen or $C_1$-$C_6$ alkyl;

R₂ is selected from —CR₄R₅, —NR₄R₅ or 5-6-membered heteroaryl, wherein the heteroaryl is optionally substituted by one or more R₆, and R₆ is $C_1$-$C_6$ alkyl optionally substituted by hydroxyl or cyano;

R₃ is selected from hydrogen or halogen;

R₄ and R₅ are each independently selected from $C_1$-$C_6$ alkyl, $C_1$-$C_6$ alkoxy or 4-6-membered heterocyclyl;

U, V, and L are each independently selected from C or N, and at least one of U, V or L is N;

R₇ is selected from hydrogen or $C_1$-$C_6$ alkyl;

n=0 or 1; and

===== represents a single bond or a double bond.

4. The compound according to claim 1, wherein

R₁ is selected from chlorine or methyl;

R₂ is selected from the following substituents:

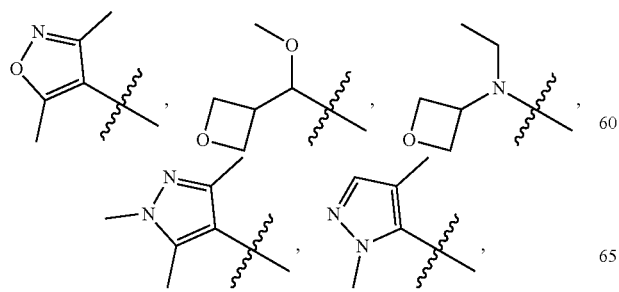

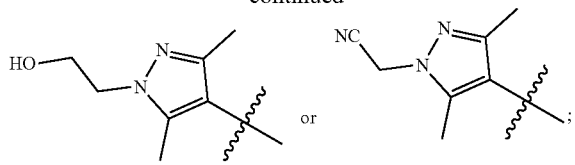

R₃ is selected from hydrogen or chlorine;

U, V, and L are each independently selected from C or N, and at least one of U, V or L is N;

R₇ is selected from hydrogen or methyl;

n=0 or 1; and

===== represents a single bond or a double bond.

5. The compound according to claim 1, wherein the compound is any one of the following compounds:

10-chloro-9-(3,5-dimethylisoxazol-4-yl)-2-((4-methoxy-6-methyl-2-oxo-1,2-dihydropyridin-3-yl)methyl)-3,4-dihydro-[1,4]diazepino[6,7,1-HI]indol-1(2H)-one (1)

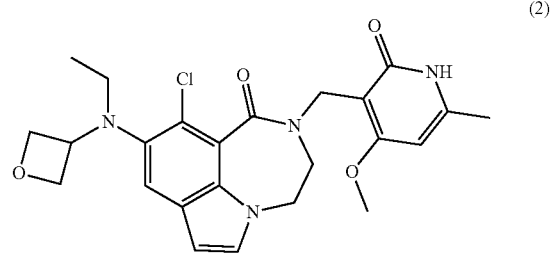

10-chloro-9-(ethyl(oxetan-3-yl)amino)-2-((4-methoxy-6-methyl-2-oxo-1,2-dihydropyridin-3-yl)methyl)-3,4-dihydro-[1,4]diazepino[6,7,1-HI]indol-1(2H)-one (2)

(2)

10-chloro-9-(3,5-dimethylisoxazol-4-yl)-2-((4-methoxy-6-methyl-2-oxo-1,2-dihydropyridin-3-yl)methyl)-3,4,6,7-tetrahydro-[1,4]diazepino[6,7,1-HI]indol-1(2H)-one (3)

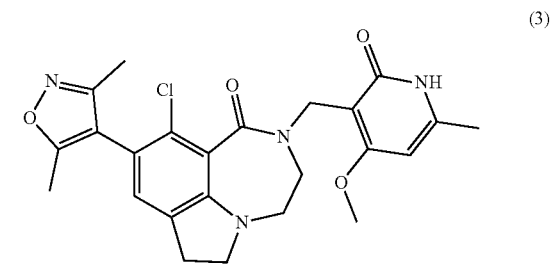

10-chloro-2-((4-methoxy-6-methyl-2-oxo-1,2-dihydro-pyridin-3-yl)methyl)-9-(1,3,5-trimethyl-1H-pyrazol-4-yl)-3,4-dihydro-[1,4]diazepino[6,7,1-HI]indol-1(2H)-one (4)

(4)

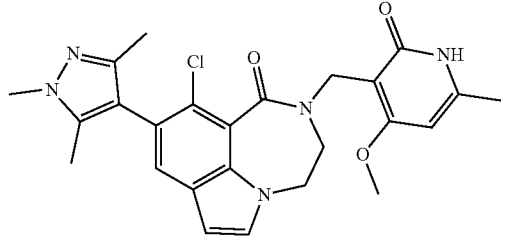

10-chloro-9-(1,4-dimethyl-1H-pyrazol-5-yl)-2-((4-methoxy-6-methyl-2-oxo-1,2-dihydropyridin-3-yl)methyl)-3,4-dihydro-[1,4]diazepino[6,7,1-HI]indol-1(2H)-one (5)

(5)

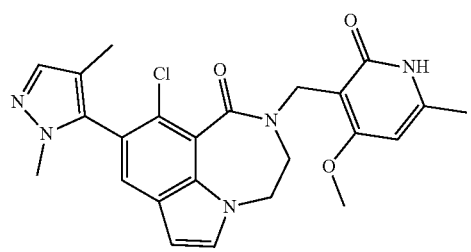 [SMILES: COc1cc(C)[nH]c(=O)c1CN1CCn2ccc3cc(-c4c(C)cnn4C)c(Cl)c(c32)C1=O]

7,10-dichloro-9-(1,4-dimethyl-1H-pyrazol-5-yl)-2-((4-methoxy-6-methyl-2-oxo-1,2-dihydropyridin-3-yl)methyl)-3,4-dihydro-[1,4]diazepino[6,7,1-HI]indol-1(2H)-one (6)

(6)

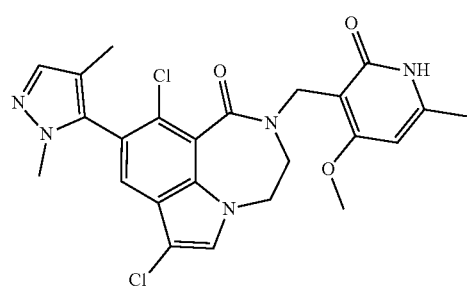

10-chloro-9-(1-(2-hydroxyethyl)-3,5-dimethyl-1H-pyrazol-4-yl)-2-((4-methoxy-6-methyl-2-oxo-1,2-dihydro-pyridin-3-yl)methyl)-3,4-dihydro-[1,4]diazepino[6,7,1-HI]indol-1(2H)-one (7)

(7)

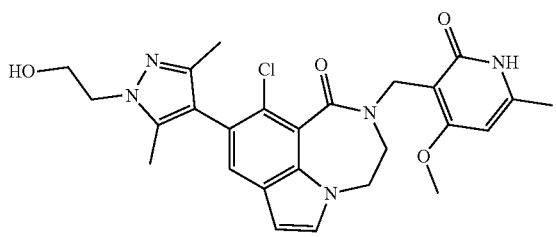 [SMILES: COc1cc(C)[nH]c(=O)c1CN1CCn2ccc3cc(-c4c(C)nn(CCO)c4C)c(Cl)c(c32)C1=O]

2-(4-(10-chloro-2-((4-methoxy-6-methyl-2-oxo-1,2-di-hydropyridin-3-yl)methyl)-1-oxo-1,2,3,4-tetrahydro-[1,4]diazepino[6,7,1-HI]indol-9-yl)-3,5-dimethyl-1H-pyrazol-1-yl)acetonitrile (8)

(8)

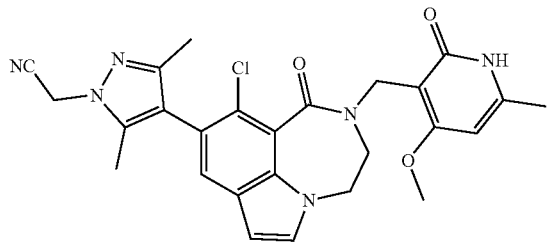 [SMILES: COc1cc(C)[nH]c(=O)c1CN1CCn2ccc3cc(-c4c(C)nn(CC#N)c4C)c(Cl)c(c32)C1=O]

10-chloro-9-(methoxy(oxetan-3-yl)methyl)-2-((4-methoxy-6-methyl-2-oxo-1,2-dihydropyridin-3-yl)methyl)-3,4-dihydro-[1,4]diazepino[6,7,1-HI]indol-1(2H)-one (9)

(9)

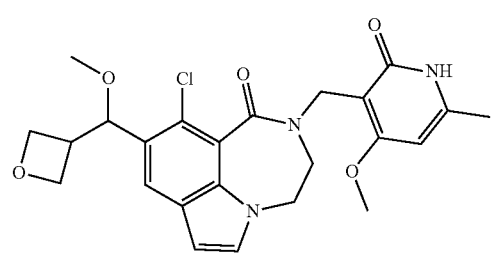 [SMILES: COc1cc(C)[nH]c(=O)c1CN1CCn2ccc3cc(C(OC)C4COC4)c(Cl)c(c32)C1=O]

(R)-10-chloro-9-(methoxy(oxetan-3-yl)methyl)-2-((4-methoxy-6-methyl-2-oxo-1,2-dihydropyridin-3-yl)methyl)-3,4-dihydro-[1,4]diazepino[6,7,1-HI]indol-1(2H)-one (10)

(10)

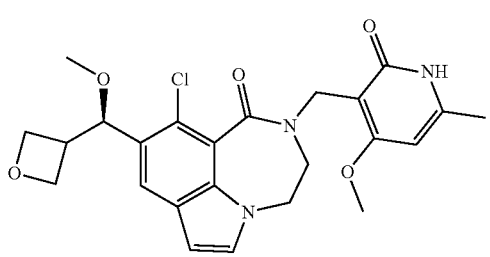

(S)-10-chloro-9-(methoxy(oxetan-3-yl)methyl)-2-((4-methoxy-6-methyl-2-oxo-1,2-dihydropyridin-3-yl)methyl)-3,4-dihydro-[1,4]diazepino[6,7,1-HI]indol-1(2H)-one (11)

(11)

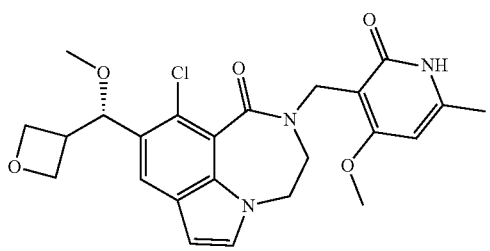 [SMILES: COc1cc(C)[nH]c(=O)c1CN1CCn2ccc3cc([C@@H](OC)C4COC4)c(Cl)c(c32)C1=O]

5-chloro-4-(3,5-dimethylisoxazol-4-yl)-7-((4-methoxy-6-methyl-2-oxo-1,2-dihydropyridin-3-yl)methyl)-8,9-dihydro-[1,4]diazepino[6,7,1-HI]indazol-6(7H)-one (12)

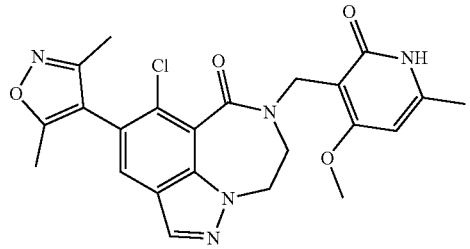 [SMILES: COc1cc(C)[nH]c(=O)c1CN1CCn2ncc3cc(-c4c(C)noc4C)c(Cl)c(c32)C1=O]

(12)

5-chloro-4-(3,5-dimethylisoxazol-4-yl)-7-((4-methoxy-6-methyl-2-oxo-1,2-dihydropyridin-3-yl)methyl)-8,9-dihydro-2,7,9a-triazabenzo[cd]azulen-6(7H)-one (13)

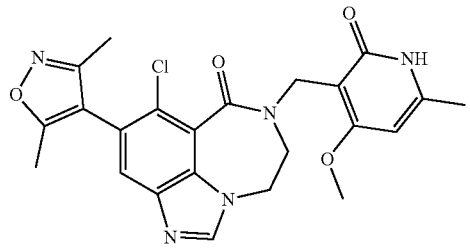

(13)

9-(methoxy(oxetan-3-yl)methyl)-2-((4-methoxy-6-methyl-2-oxo-1,2-dihydropyridin-3-yl)methyl)-10-methyl-3,4-dihydro-[1,4]diazepino[6,7,1-HI]indol-1(2H)-one (14)

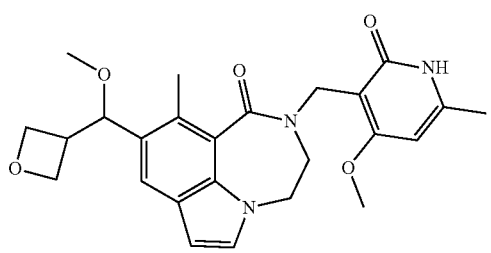 [SMILES: COc1cc(C)[nH]c(=O)c1CN1CCn2ccc3cc(C(OC)C4COC4)c(C)c(c32)C1=O]

(14)

9-(3,5-dimethylisoxazol-4-yl)-2-((4-methoxy-6-methyl-2-oxo-1,2-dihydropyridin-3-yl)methyl)-10-methyl-3,4-dihydro-[1,4]diazepino[6,7,1-HI]indol-1(2H)-one (15)

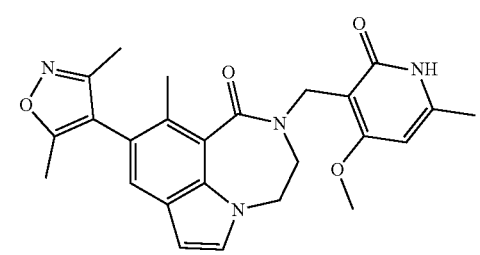 [SMILES: COc1cc(C)[nH]c(=O)c1CN1CCn2ccc3cc(-c4c(C)noc4C)c(C)c(c32)C1=O]

(15)

10-chloro-9-(3,5-dimethylisoxazol-4-yl)-2-((4-methoxy-6-methyl-2-oxo-1,2-dihydropyridin-3-yl)methyl)-4-methyl-3,4-dihydro-[1,4]diazepino[6,7,1-HI]indol-1(2H)-one (16)

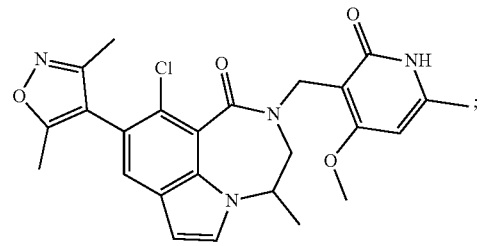

(16)

10-chloro-9-(3,5-dimethylisoxazol-4-yl)-2-((4-methoxy-6-methyl-2-oxo-1,2-dihydropyridin-3-yl)methyl)-3-methyl-3,4-dihydro-[1,4]diazepino[6,7,1-HI]indol-1(2H)-one (17)

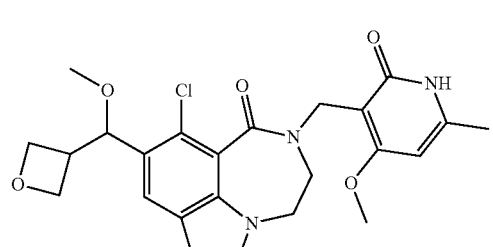

(17)

6. The compound according to claim 1, wherein the compound is any one of the following compounds:

10-chloro-9-(methoxy(oxetan-3-yl)methyl)-2-((4-methoxy-6-methyl-2-oxo-1,2-dihydropyridin-3-yl)methyl)-3,4-dihydro-[1,4]diazepino[6,7,1-HI]indol-1(2H)-one (9)

(9)

(R)-10-chloro-9-(methoxy(oxetan-3-yl)methyl)-2-((4-methoxy-6-methyl-2-oxo-1,2-dihydropyridin-3-yl)methyl)-3,4-dihydro-[1,4]diazepino[6,7,1-HI]indol-1(2H)-one (10)

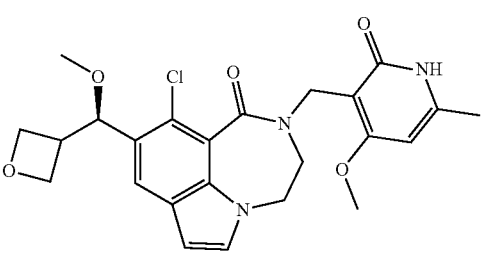

(10)

(S)-10-chloro-9-(methoxy(oxetan-3-yl)methyl)-2-((4-methoxy-6-methyl-2-oxo-1,2-dihydropyridin-3-yl)methyl)-3,4-dihydro-[1,4]diazepino[6,7,1-HI]indol-1(2H)-one (11)

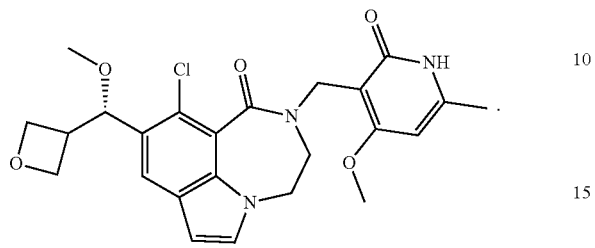

(11)

7. A pharmaceutical composition, comprising a therapeutically effective amount of the compound according to claim 1 or a pharmaceutically acceptable B salt, ester, solvate, hydrate or isomer thereof, and a pharmaceutically acceptable carrier or excipient.

8. A method for inhibiting wild-type EZH2 and treating B-cell non-Hodgkin's lymphoma, comprising: administering to a patient in need thereof an effective amount of the compound according to claim 1 or a B pharmaceutically acceptable salt, ester, solvate, hydrate or isomer thereof.

* * * * *